United States Patent
Zhou

(10) Patent No.: US 6,819,819 B2
(45) Date of Patent: Nov. 16, 2004

(54) METHOD AND APPARATUS FOR OPTICAL COMMUNICATION

(76) Inventor: Ping Zhou, 31564 Agoura, Unit 1, Westlake Village, CA (US) 91361

( * ) Notice: Subject to any disclaimer, the term of this patent is extended or adjusted under 35 U.S.C. 154(b) by 0 days.

(21) Appl. No.: 10/338,542

(22) Filed: Jan. 7, 2003

(65) Prior Publication Data

US 2003/0179985 A1 Sep. 25, 2003

Related U.S. Application Data

(60) Provisional application No. 60/346,662, filed on Jan. 8, 2002.

(51) Int. Cl.[7] ............................................. G02B 6/26
(52) U.S. Cl. ........................................ 385/16; 398/115
(58) Field of Search ....................... 385/14–16, 18–22, 385/24, 31, 39, 50, 47, 147; 359/320; 398/115, 119, 130, 138

(56) References Cited

U.S. PATENT DOCUMENTS

| | | | |
|---|---|---|---|
| 4,978,188 A | * | 12/1990 | Kawachi et al. ............ 385/130 |
| 4,999,112 A | * | 3/1991 | Dobuler et al. ............. 210/656 |
| 5,136,669 A | * | 8/1992 | Gerdt ........................... 385/39 |
| 5,144,375 A | * | 9/1992 | Gabriel et al. .............. 359/320 |
| 6,477,289 B1 | | 11/2002 | Li |
| 2002/0114556 A1 | | 8/2002 | Kato et al. |
| 2002/0131676 A1 | | 9/2002 | Brockett et al. |
| 2002/0135863 A1 | | 9/2002 | Fukshima et al. |
| 2003/0179985 A1 | * | 9/2003 | Zhou ............................. 385/16 |

* cited by examiner

Primary Examiner—Akm Enayet Ullah
(74) Attorney, Agent, or Firm—Noblitt & Gilmore, LLC

(57) ABSTRACT

A method and apparatus for communications according to various aspects of the present invention comprises a switching system configured to receive optical signals and direct the optical signals along a selected optical path. The switching system suitably includes more than one switch, and at least one of the switches may include a variable refractive material having a first state and a second state, wherein the optical signal is transmitted via a first path when the variable refractive material is in the first state and the individual channel signal is transmitted via a second path when the variable refractive material is in the second state. The switching system may alternatively or additionally include a switch element having a reflective state and a transmissive state, wherein the optical signal is reflected via a first path when the switch element is in the reflective state and the individual channel signal is transmitted via a second path when the switch element is in the transmissive state.

70 Claims, 26 Drawing Sheets

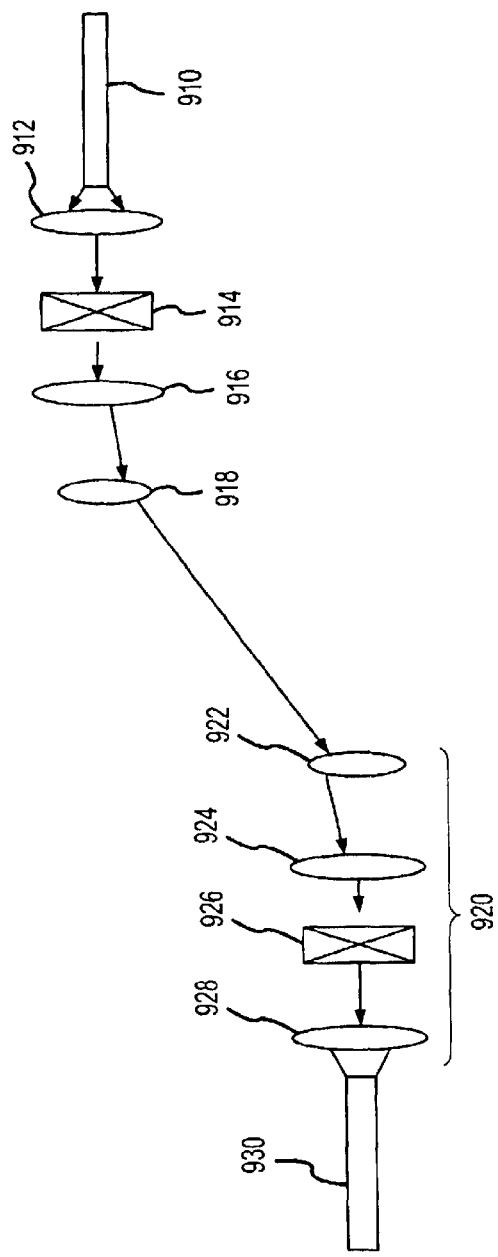
FIG.9A
FIG.9B

METHOD AND APPARATUS FOR OPTICAL COMMUNICATION

CROSS-REFERENCES TO RELATED APPLICATIONS

This application claims the benefit of U.S. Provisional Patent Application No. 60/346,662, filed Jan. 8, 2002, and incorporates the disclosure of the application by reference.

FIELD OF THE INVENTION

The invention relates to methods and apparatus for optical switches and optical communication.

BACKGROUND OF THE INVENTION

Optical switches are widely used in the fiber optical communication industry. Typically, optical switches operate as network protection switches or elements of optical add/drop systems. As transmission bands, switching speeds, and traffic capacities increase, communication systems demand smaller, cheaper, and better devices and switches.

Conventional optical switches used for network protection are mostly mechanical switches, which contribute significant bulk due to the design configuration. Conventional switches normally employ a rotating mirror or rotating slice in the optical path to steer the beam in different directions to perform the switching function. Due to the large size and rotation of the mirror, the switch normally requires a collimator for each optical port (input and output) to extend the optical path to put rotation mirrors and other switching mechanisms into the optical path to block or switch the optical beams. The cost to build each individual switch module is difficult to reduce due to the many components employed, such as the collimators.

Optical communication systems also generally employ other components, such as optical add/drop multiplexers (OADM). These systems require compact switches, ideally integrated into a small switch array. Conventional switches, however, are typically produced using MEMS technology, which is very expensive. Further, MEMS switches are difficult to equip with a latching mechanism to maintain the status of the switch when power is terminated. In addition, MEMS switches typically have moving parts subject to wear and often require high voltage to control the switch, both of which tend to reduce reliability.

SUMMARY OF THE INVENTION

A method and apparatus for communications according to various aspects of the present invention comprises a switching system configured to receive optical signals and direct the optical signals along a selected optical path. The switching system suitably includes more than one switch, and at least one of the switches may include a variable refractive material having a first state and a second state, wherein the optical signal is transmitted via a first path when the variable refractive material is in the first state and the individual channel signal is transmitted via a second path when the variable refractive material is in the second state. The switching system may alternatively or additionally include a switch element having a reflective state and a transmissive state, wherein the optical signal is reflected via a first path when the switch element is in the reflective state and the individual channel signal is transmitted via a second path when the switch element is in the transmissive state.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps.

FIGS. 9A–C are diagrams of optical systems having lenses, switches, and mirrors to change the optical path;

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention is described partly in terms of functional components and various processing steps. Such functional components may be realized by any number of components configured to perform the specified functions and achieve the various results. For example, the present invention may employ various elements, lenses, refractors, collimators, materials, light sources, light transmitters, reflectors, and the like, which may carry out a variety of functions. In addition, the present invention may be practiced in conjunction with any number of applications, environments, communications systems, and actuating characteristics, and the systems described are merely exemplary applications for the invention. Further, the present invention may employ any number of conventional techniques for manufacturing, assembling, integration, and the like.

Figure 1:
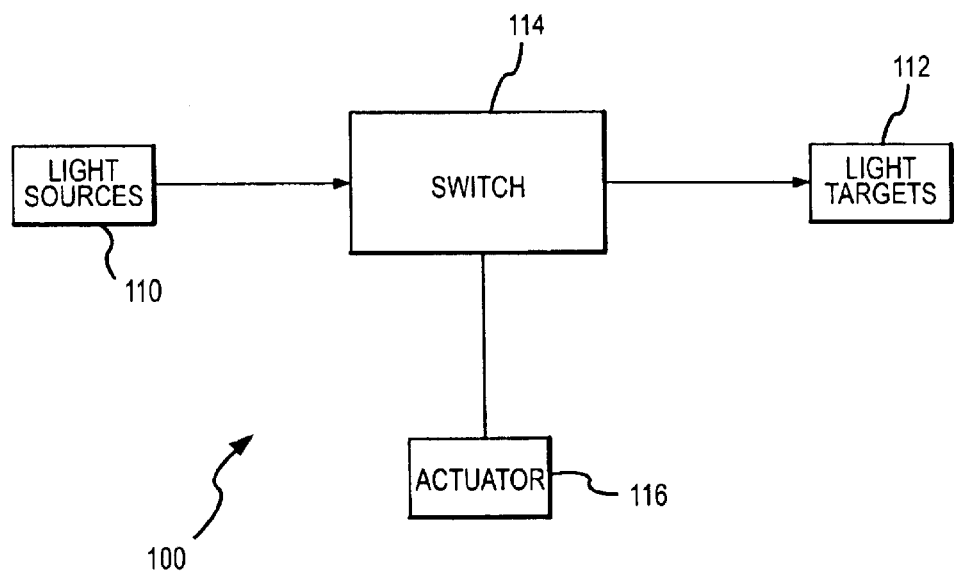
FIG. 1 is a block diagram of a switching system according to various aspects of the present invention.

Referring now to FIG. 1, an optical switching module 100 according to various aspects of the present invention may be implemented in conjunction with a light source 110, a light target 112, a switch 114, and an actuator 116. The light source 110 is configured to provide light for selective transmission by the switch 114. The light source 110 may comprise any appropriate system for providing light to the switch 114, such as a conventional fiber optic strand or waveguide coupled to the switch 114. Further, the light source 110 may include additional components for directing or enhancing the light, such as focusing, collimating, amplifying, deflecting, and/or filtering the light. The light may be generated by and/or received from any appropriate light generator, such as a laser.

Conversely, the light target 112 selectively receives the light from the light source 110 via the switch 114. The light target 112 may comprise any appropriate receiving element for the light, such as an output fiber, output waveguide, or signal detector. The light target 112 may also comprise any appropriate element for registering or amplifying the light received, such as an optical amplifier, a charge coupled device, a photocell, a photodiode, or other optical signal detection system. Further, the light target 112 may include additional components for receiving, directing, or enhancing the light, such as focusing, collimating, amplifying, deflecting, and/or filtering the light.

The switch 114 selectively changes the path of incident light. More particularly, the switch 114 has at least two states. The state of the switch is responsive to at least one trigger event, such as a trigger event caused by the actuator 116. The path of the incident light is directed to different light targets 112 according to the state of the switch 114. The path of the light may be changed in any suitable manner, such as by reflectively and/or refractively changing the path of the light.

The actuator 116 selectively changes the state of the switch 114. The configuration of the actuator 116 may be adapted according to the responsiveness and/or other characteristics of the switch 114. Any appropriate actuator may be used to change the state of the switch 114, including a mechanical actuator, an electrical actuator such as a pair of electrodes, a heating element, a light source, a magnetic field generator, a chemical, or any other system for changing the state of the particular switch 114. For example, the actuator 116 may be configured to change the state of the switch 114 between a transmissive state and a reflective state. Alternatively, the actuator 116 may be configured to change the state of the switch between a first state having a first refractive index and a second state having a second refractive index to change the path of light passing through the switch. In another embodiment, the actuator 116 may, alternatively or additionally, change the state of the switch 114 from a first state having a first reflective path to a second state having a second reflective path. The actuator 116 may interact with the switch 114 electrically or via any other suitable mechanism or characteristic, such as magnetically, optically, thermally, and/or nonlinearly. In various embodiments, the switch 114 and actuator 116 may be configured with or without moving parts.

Figure 2:
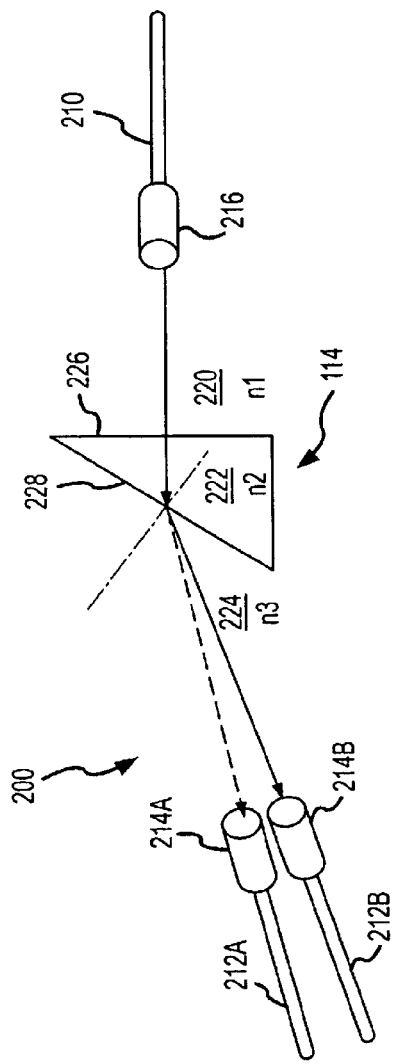
FIG. 2 is an illustration of a 1×2 optical switch having a variable refractive material.

Referring to FIG. 2, an exemplary embodiment of the optical switching module 100 according to various aspects of the present invention comprises a 1×2 optical switching module 200. The 1×2 optical switching module 200 includes the light source 110 comprising an input port 210 and the light target 112 comprising two output ports 212A–B. The input port 210 and output ports 212A–B suitably comprise fiber optic strands. The input port 210 and output ports 212A–B may include additional components to improve the optical characteristics of the input port 210 and output ports 212A–B, such as collimators 214A–B, 216.

In the present embodiment, the switch 114 comprises a fully optical, mirrorless optical switch including one or more media having an adjustable refractive index. In the present embodiment, the switch 114 comprises three media 220, 222, 224 having refractive indices of n1, n2, and n3, respectively. At least one of the refractive indices, such as the second refractive index n2, is variable. In an alternative embodiment, the switch comprises only two media 220, 222, such that n1 and n3 are substantially identical. Any appropriate number of media, however, having any suitable refractive indices may be deployed.

When the refractive index n2 is adjusted to have a first value, incident light is directed to the first output port 212A. Conversely, when the refractive index n2 is adjusted to have a second value, incident light is directed to the second output port 212A. Thus, by changing the refractive index of one or more optical media, the light from the light source 110 may be selectively directed to the light target 112.

The various optical media 220, 222, 224 may comprise any suitable materials, including crystal, glass, solution, semiconductor material, nonlinear optical material, liquid materials such as liquid crystal and other liquid organic and inorganic material, plastic materials such as polymers or other organic material, gaseous materials, and other organic and inorganic material and/or compounds. For example, the variable medium 222 having the variable refractive material n2 may comprise a liquid or gas optical medium contained within a cavity. The cavity may be formed within a solid material comprising the other optical media, or may be formed by a container, such as a container of glass, semiconductor, crystal, plastic, or other suitable material.

In addition, the various media may be configured in any suitable manner. The switch 114 of the present embodiment comprises at least two optical interfaces 226, 228 where two different media meet, such as the n1/n2 boundary and the n2/n3 boundary.

The optical interfaces 226, 228 are configured at an angle to each other such that incident light is refracted at one or more of the optical interfaces 226, 228. The angle may be greater than zero but may be less than the relevant total internal reflection angle.

The optical interfaces 226, 228 may be configured in any appropriate manner to facilitate the transmission and desired refraction of light. For example, the medium having the adjustable refractive index n2 may be configured as a prism, as an optical interface presented at an angle to the incident beam other than perpendicular, as one or more optical windows through which light may pass, as an open cell with optical windows and spacers in between, or in any other suitable configuration. Further, the switch 114 may also include other elements, treatments, or characteristics to achieve desired characteristics. For example, the interfaces 226, 228 between the various media may include an optical coating, such as an antireflectance coating or an optical impedance-matching material.

Figure 3:
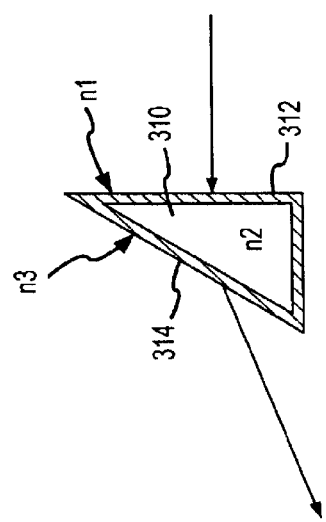
FIG. 3 is an illustration of a variable refractive material having adjacent media with different refractive indices.

Referring to FIG. 3, an alternative exemplary embodiment of the switch 114 comprises a first optical medium 310 having a first refractive index n2. The first medium 310 is adjacent a second optical medium 312 along the incoming light path and a third optical medium 314 along the outgoing light path, each having a particular refractive index n1 and n3. The various optical media 310, 312, 314 may comprise any suitable material, including solid, liquid, gas, or plasma. In addition, the refractive indices of the various materials 310, 312, 314 may be adjustable or substantially constant, and may be selected according to any appropriate criteria. For example, n1 and n3 may be approximately equal or different.

Figure 4:
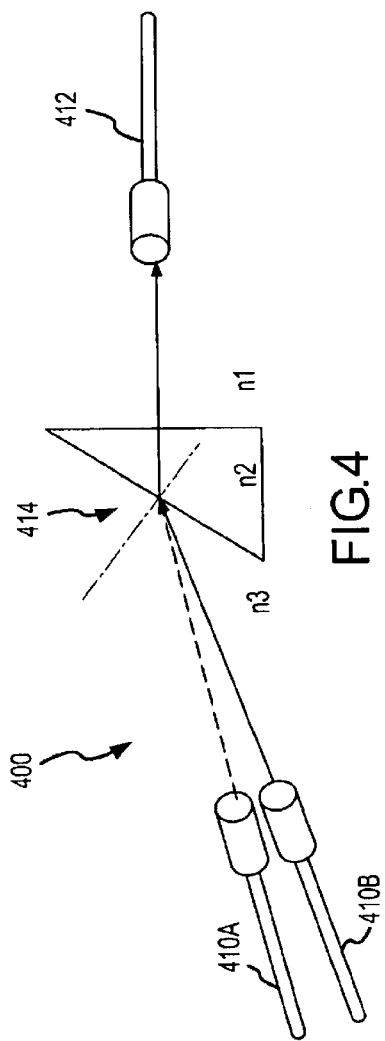
FIG. 4 is an illustration of a 2×1 optical switch having a variable refractive material.

Furthermore, any suitable number of light sources 110 and light targets 112 may be used. Referring to FIG. 4, an alternative optical switch module comprises a 2×1 switching module 400 including two light sources 410A–B and one light target 412. The switch 114 comprises an adjustable switch element 414 having an adjustable refractive index. When the switch element 414 is to transmit light from the first light source 410A, the refractive index of the switch element 414 may be selected to direct the light toward the light target 412. Similarly, when the switch element 414 is to transmit light from the second light source 410B, the refractive index of the switch element 414 may be adjusted to direct the light at a more acute angle, thus transmitting light from the second light source 410B toward the light target 412.

Figure 5:
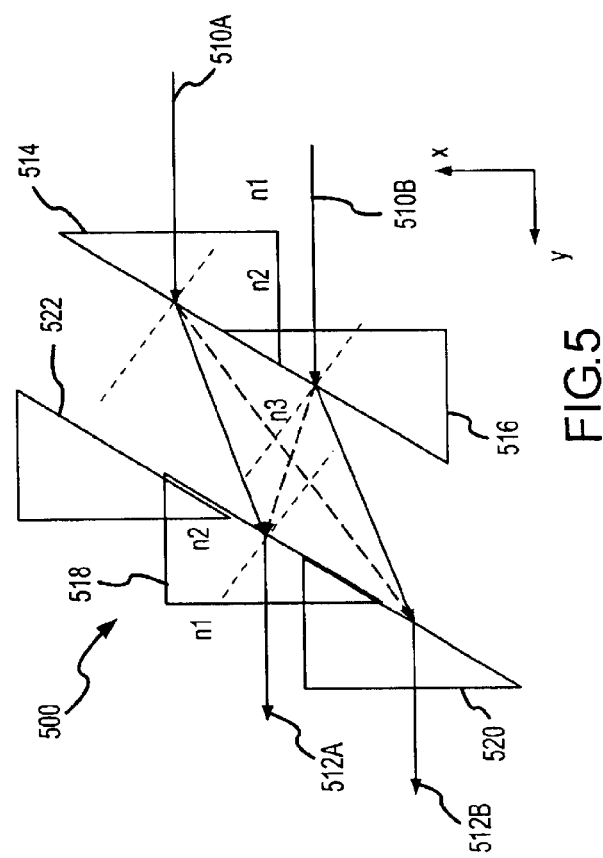
FIG. 5 is an illustration of a 2×2 optical switch having a variable refractive material.

An optical switching module 100 according to various aspects of the present invention may also be configured with multiple light sources 110 and light targets 112. The optical switching module 100 may be configured with any suitable number of light sources 110 and light targets 112, such as 2×2, 1×N, N×1, or a three-dimensional N×M optical cross connection (OXC) switching system. For example, referring to FIG. 5, a 2×2 switching module 500 has two light sources 510A–B and two light targets 512A–B. The switch 114 suitably comprises a first switch element 514 that receives light from the first light source 510A, a second switch element 516 that receives light from the second light source 510B, and a third switch element 518 and a fourth switch element 520 that transmit incident light to the first and second light targets 512A–B, respectively.

In a first state, the first switch element 514 is configured to transmit light to the third switch element 518 and the second switch element 516 is configured to transmit light to the fourth switch element 520. Conversely, in a second state, the first switch element 514 is configured to transmit light to the fourth switch element 520 and the second switch element 516 is configured to transmit light to the third switch element 518. The refractive indices of the first and second switch elements 514, 516 and the relative positions of the switch elements 514, 516, 518, 520 are selected such that the light transmitted through the first and second switch elements 514, 516 arrives at the third and fourth switch elements 518, 520 at selected angles.

The third and fourth switch elements 518, 520 are configured to transmit light to the light targets 512A–B. The third and fourth switch elements 518, 520 suitably have multiple states to transmit light to the light targets 512A–B. For example, in a first state, the third and fourth switch elements 518, 520 have appropriate refractive indices to transmit light from the first switch element 514 to the first light target 512A and from the second switch element 516 to the second light target 512B, respectively. Conversely, in a second state, the third and fourth switch elements 518, 520 have appropriate refractive indices to transmit light from the first switch element 514 to the second light target 512B and from the second switch element 516 to the first light target 512A, respectively.

Although the present embodiment relates to a 2×2 switch, any appropriate number of inputs and outputs may be deployed, for example using different states for the various switches. Referring again to FIG. 5, an additional switch element 522 may be included in the switching module 500 and accessed by adding a third refractive state for the first and second switch elements 514, 516 to target the additional switch element 522.

Figure 6:
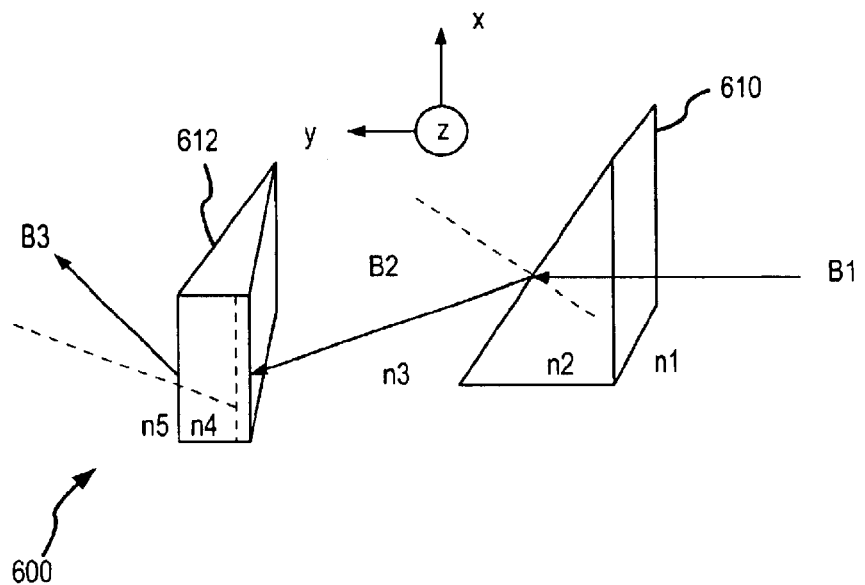
FIG. 6 is an illustration of an optical switch having a variable refractive material and a three-dimensional optical path.

The switching module 100 may also be configured to transmit light in three dimensions. Consequently, the light sources 110 and light targets 112 may be situated in different approximate planes. For example, referring to FIG. 6, a 3-D optical switching system 600 according to various aspects of the present invention includes a switch 114 having a first switching element 610 and a second switching element 612. The first switching element 610 is suitably configured to transmit light at an angle to the incident beam in a first x-y plane. The second switching element 612 is suitably configured to transmit light at an angle outside the x-y plane. Consequently, the light from the light source 110 may be transmitted to the light target 112 when the light target 112 is not in the same plane as the initial refraction of the light by the first switching element 610.

Figure 7:
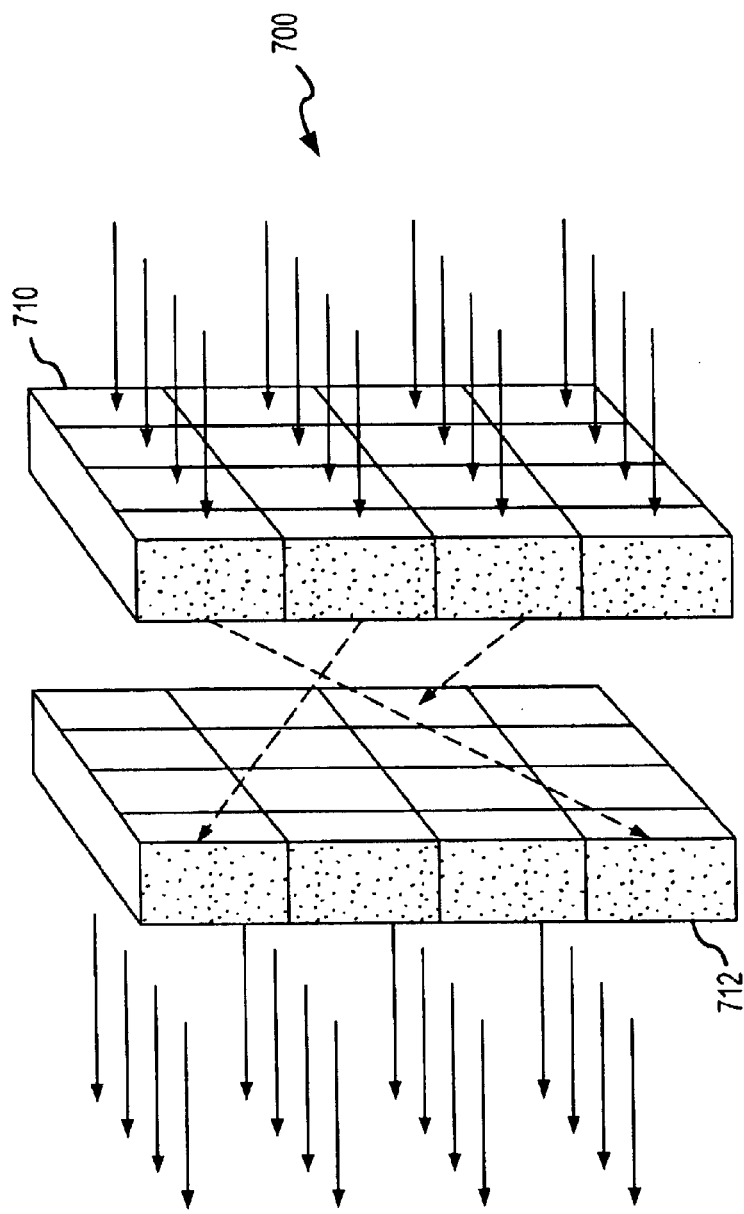
FIG. 7 is an illustration of a three-dimensional optical switch array.

An optical switching array may comprise multiple switches 114 operating in two or three planes. Referring to FIG. 7, an exemplary M×N optical switching array 700 suitably comprises an input array of switching elements 710 and an output array of switching elements 712. Each of the individual switching elements in the arrays 710, 712 may be individually controlled. In addition, each array 710, 712 may have a different number of switching elements, and each individual switching element may comprise one or more switching modules and other components to direct light in a particular direction.

Incident light from the light sources 110 is received by the switching elements in the input array 710 and directed according to the adjusted refractive index of the individual switching element. The light is directed to a particular switching element in the output array 712, which is adjusted to have a refractive index that directs light to the appropriate light target 112. Each switching element in the input array 710 may direct light toward one or more switching elements in the output array 712; likewise, each switching element in the output array 712 may receive light from one or more switching elements in the input array 710.

Figure 8E:
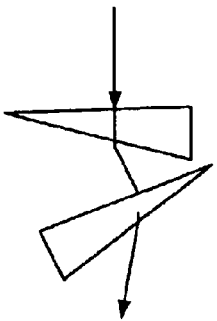
FIGS. 8A–F are diagrams of optical media having different orientations and/or optical paths.
Figure 8F:
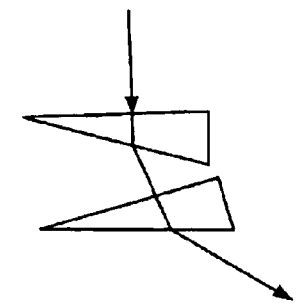
Figure 8C:
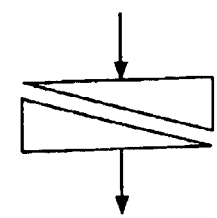
Figure 8D:
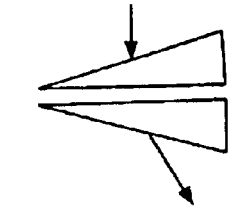
Figure 8A:
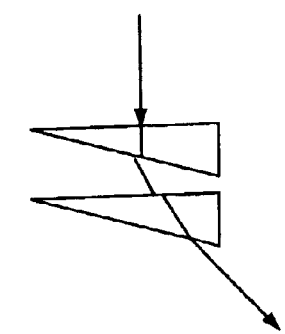
Figure 8B:
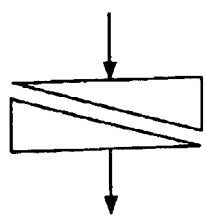

The switch 114 may be configured in any appropriate manner to facilitate the direction of light from the desired light source 110 to the desired light target 112. In various embodiments, the switch 114 may comprise multiple components and/or materials. For example, referring to FIG. 8, multiple switching elements may be cascaded in a series to direct light at different angles. The multiple switching elements may be aligned with parallel faces (FIG. 8C), aligned with parallel backs (FIGS. 8A, 8D, and 8E), or with an angled gap in between the two elements (FIGS. 8B and 8F) to provide multiple refraction of the incident light beam. By selecting the respective positions of the switching elements, the propagation path of the light may be more effectively turned. Thus, by forming a cascade of switching elements, the light may be directed at selected angles according to a desired geometry.

Further, a cascade of switching elements may facilitate directing light to a greater number of light targets 112. For example, a first input switching element may selectively direct light to a second and a third switching element. The second and third switching elements may direct light to four different light targets 112. Thus, light from a single light source 110 may be directed to four different light targets. Any number of light sources 110 and light targets 112 may be used by suitably configuring the cascade of switching elements.

The optical switching module 100 may include additional components to direct or collect light or otherwise affect the performance of the optical switching module 100. For example, the switch 114, light source 110, and/or light target 112 may include one or more lenses, collimators, mirrors, or other elements. Referring to FIG. 9A, an enhanced optical switch module 900 according to various aspects of the present invention includes a light source 110 having a fiber optic light input 910 and a collimator 912 for focusing light on a first switch element 914, and a light target 112 having a fiber optic light output 930 and a collimator 928 for focusing light received from a second switch element 926.

At least one light path selectable by the switch 914 passes through additional components to facilitate the focusing and redirection of the light to the light target 112. In the present embodiment, the optical path includes additional lenses, such as two lenses 916, 918, which may be configured in any suitable manner. Similarly, an output portion 920 of the enhanced optical switch module 900 may include various elements for directing and focusing light. In the present embodiment, the output portion 920 includes two lenses 922, 924 to focus and direct light to a second switch element 926. The second switch element 926 directs the light to the collimator 928, which focuses the light into an output optic fiber, waveguide, or other port 930.

Figure 9C:
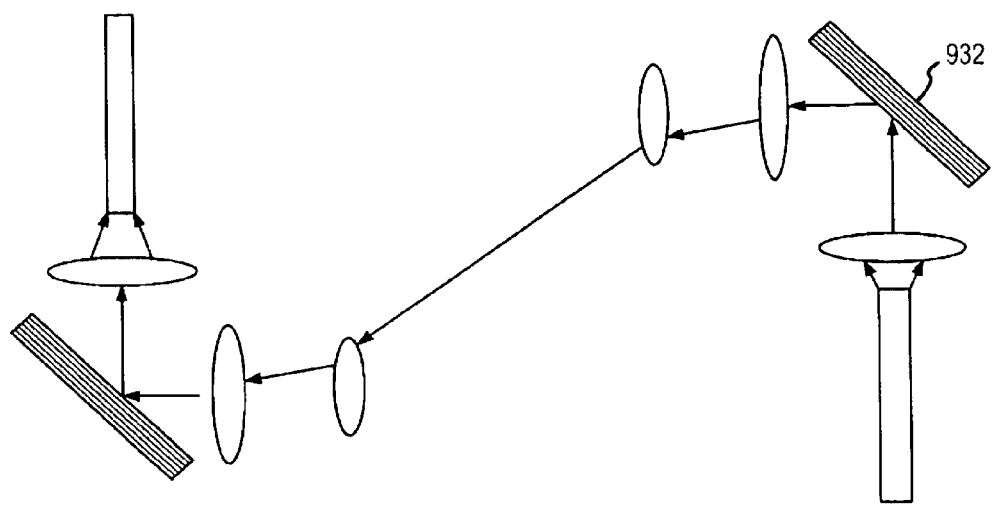

The lenses 916, 918 and 922, 924 suitably have common or nearby focal points. Further, the lenses 916, 918 and 922, 924 may comprise any suitable lenses and/or configuration of lenses. In the present embodiment, the lenses 916, 918, 922, 924 comprise convex lenses with different focal lengths. The focal length of the first lens 916, 924 closest to the switch 914, 926 is suitably longer than the focal length of the second lens 918, 922 farther from the switching element 914. The components placed in the optical path may, however, be configured in any suitable manner. For example, the second convex lens 918 can be replaced by a concave lens (FIG. 9B). Additional elements may be added to the enhanced optical switch module 900 independently or integrated into the other components. Referring to FIG. 9C, a lens system may be used in conjunction with switch elements comprising one or more movable mirrors 932 to achieve the desired light propagation characteristics. In addition, the mirrors 932 may be configured in any suitable manner, such as flat, concave, or convex, to provide any desired optical characteristics, such as to divert and/or focus light at a desired location.

The switch 114 may be controlled by the actuator 116 in any suitable manner, and the actuator 116 may be configured in any suitable manner to cause the switch 114 to operate. The switch 114 may be configured to respond to a particular trigger event. The actuator 116 is suitably configured to cause or restrain the event and thus operate the switch 114. For example, the switch 114 may be configured as a mechanical switch, and the actuator 116 may be configured to cause the switch to change positions. Alternatively, the switch 114 may be configured to have multiple refractive states for selectively directing light in multiple directions, and the states may be selected in response to any suitable trigger event, such as application of heat, electric fields, magnetic fields, light, or other stimulus.

Figure 10:
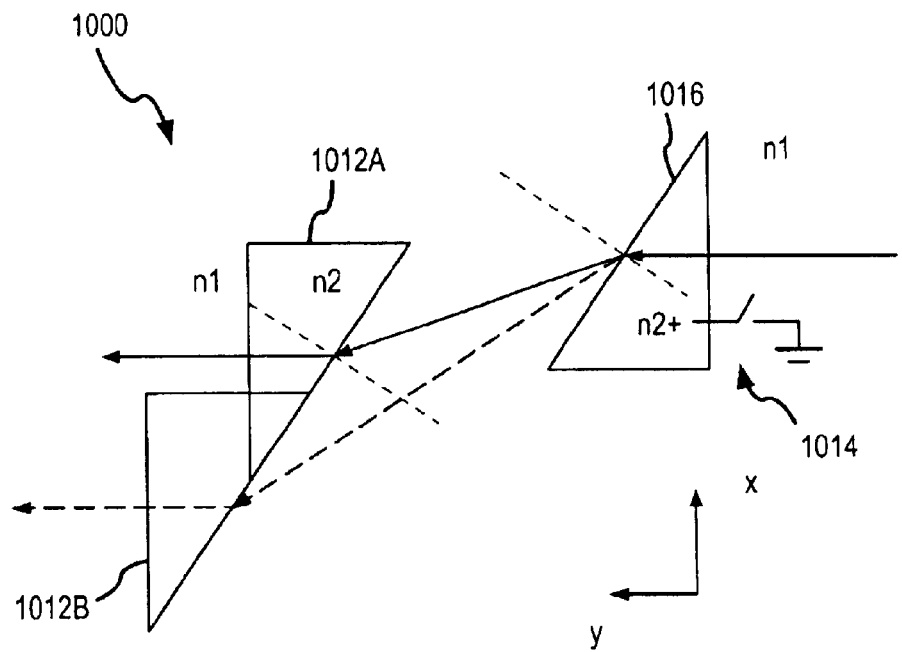
FIG. 10 is an illustration of a 1×2 optical switch having a variable refractive material responsive to electrical signals.

The actuator 116 may be configured in any suitable manner to control the event to which the switch 114 responds. For example, referring to FIG. 10, an exemplary switch module 1000 comprises an input switch element 1010 and two output switch elements 1012A–B. The input switch element 1010 changes its refractive state in response to a voltage applied to the material of the input switch element 1010.

Figure 11A:
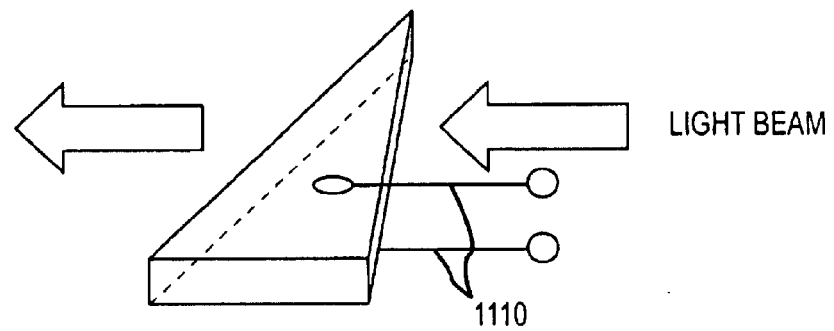
FIGS. 11A–B are illustrations of variable refractive materials responsive to electric and/or magnetic fields.
Figure 11B:
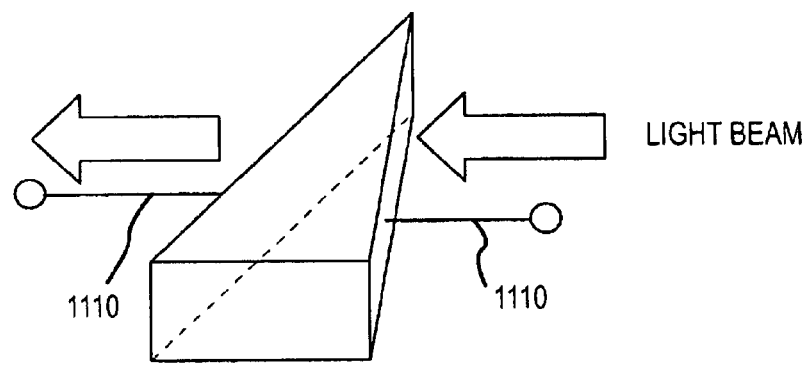

An electrical actuator 1014 is configured to provide and terminate voltage applied to the input switch element 1010 to control the switch 1000. The electrical actuator 1014 may be configured in any suitable manner to apply the voltage to the input switch element 1010. For example, referring to FIGS. 11A–B, the electrical actuator 1014 may be configured as a pair of electrodes 1110 for applying a voltage across the input switch element 1010. The voltage may be applied in any suitable manner, such as perpendicular to the light path (FIG. 11A) or parallel to the light path (FIG. 11B).

The electrodes 1110 may comprise added material attached to the switch element, or may be integrated into other portions of the switch 114 or actuator 116. For example, referring again to FIG. 3, the optical media having the refractive indices n1 and n3 may also comprise electrodes through which a voltage may be applied across the variable refractive material. Similar configurations may be used for switches 114 that respond to other electromagnetic events, such as electric fields and magnetic fields. Similar configurations may also be used for switches 114 that respond to thermal events, for example by providing heating elements on the surface of and/or embedded into the variable refractive material or the material surrounding the variable refractive material.

Figure 12A:
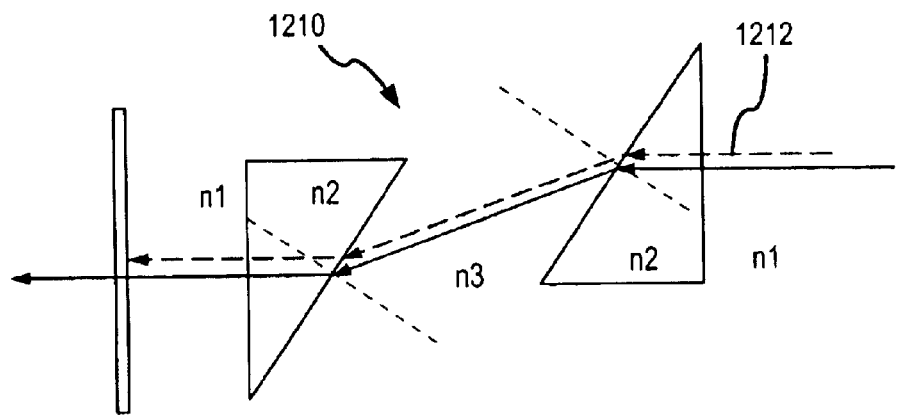
FIGS. 12A–C are illustrations of variable refractive materials responsive to light.
Figure 12B:
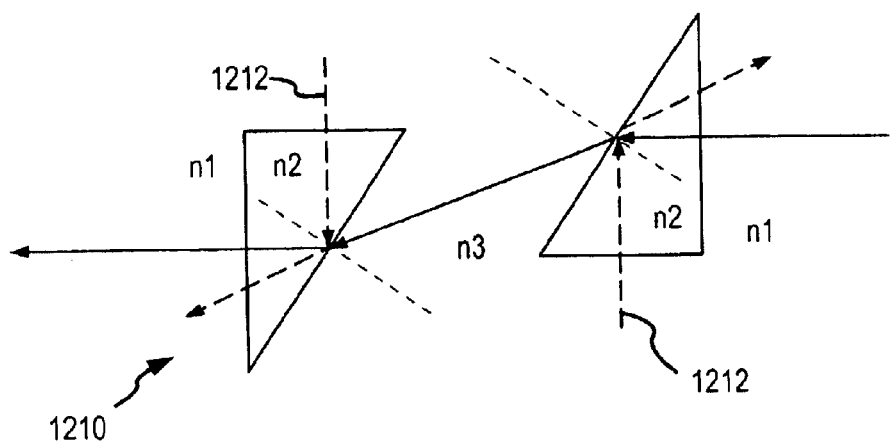
Figure 12C:
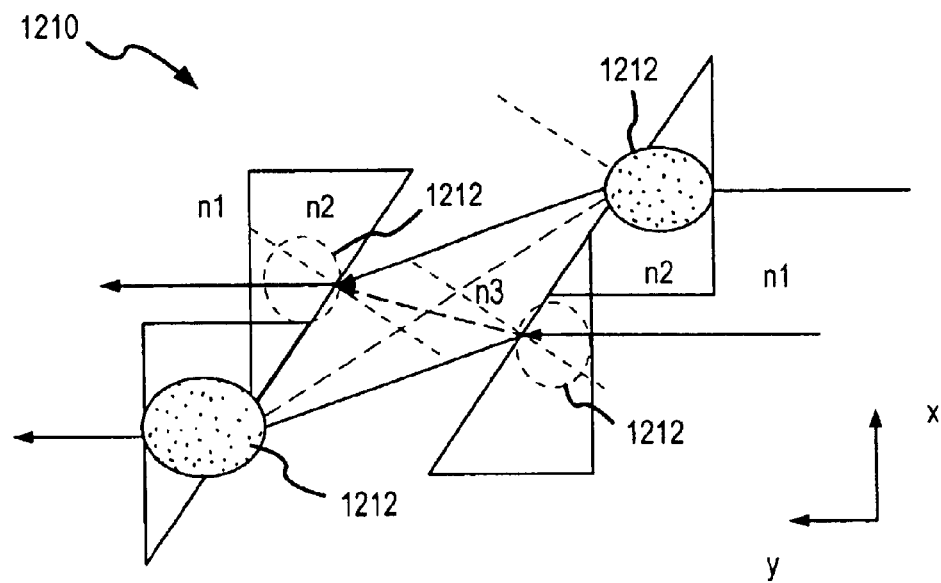

Referring to FIGS. 12A–C, a light responsive switch module 1210 responds to the presence or absence of light, such as light of a particular strength, frequency, or orientation. The light to control the light responsive switch module 1210 may be applied in any suitable manner. For example, control light for controlling the switch 1210 may be provided by a control laser 1212. The control light may be applied in any appropriate manner, such as parallel to the path of the input signal light (FIG. 12A). The switch 1210 may include a filter prior to or in the light target to filter the light from the control laser 1212. Similarly, control light may be applied along a path perpendicular to the path of the input signal light (FIGS. 12B–C).

Figure 13:
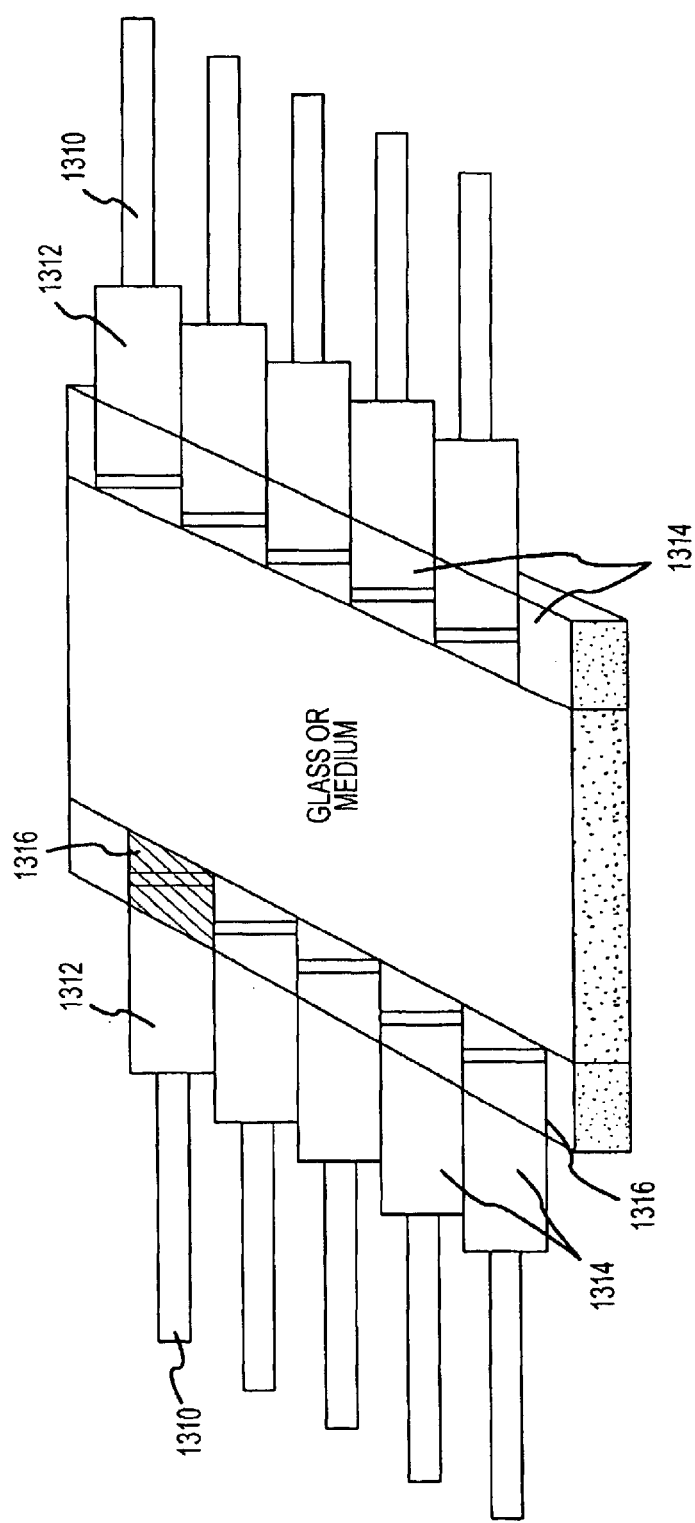
FIG. 13 is an illustration of a switch array having electrically controllable optical switches.

The actuator 116 may be added to or integrated into a switching system comprising multiple switches 114, light sources 110, and/or light targets 112. The configuration of the actuator 116 may be selected according to the configuration of the switch system and/or any other suitable criteria. For example, referring to FIG. 13, an exemplary optical switch array 1300 according to various aspects of the present invention comprises multiple light sources 110 and light targets 112, such as those comprising fiber optics 1310 and collimators 1312. The switch 114 comprises multiple switch elements 1314 responsive to an event, such as electrical voltages, currents, magnetic fields, and/or heat. The switch elements may also be separated by a medium, such as glass. To apply the signals to control the switch elements 1314, the actuator 116 suitably comprises multiple electrodes or thermal elements 1316 placed on either side of each switch element 1314. The electrodes or thermal elements 1316 may then be controlled to adjust the refractive index of each switching element 1314.

In various alternative embodiments, the switch 114 and actuator 116 may be configured to operate using optical tunneling. Generally, optical tunneling facilitates the transmission or reflection of light, or the transmission of light at certain wavelengths and reflection of other wavelengths, by a barrier under selected circumstances. Various materials, such as liquid crystal, crystal, semiconductor, and/or organic materials, may be used to enable and/or adjust the optical tunneling under certain conditions, such as the application of heat, light, electric fields, magnetic fields, and the like.

Figure 14:
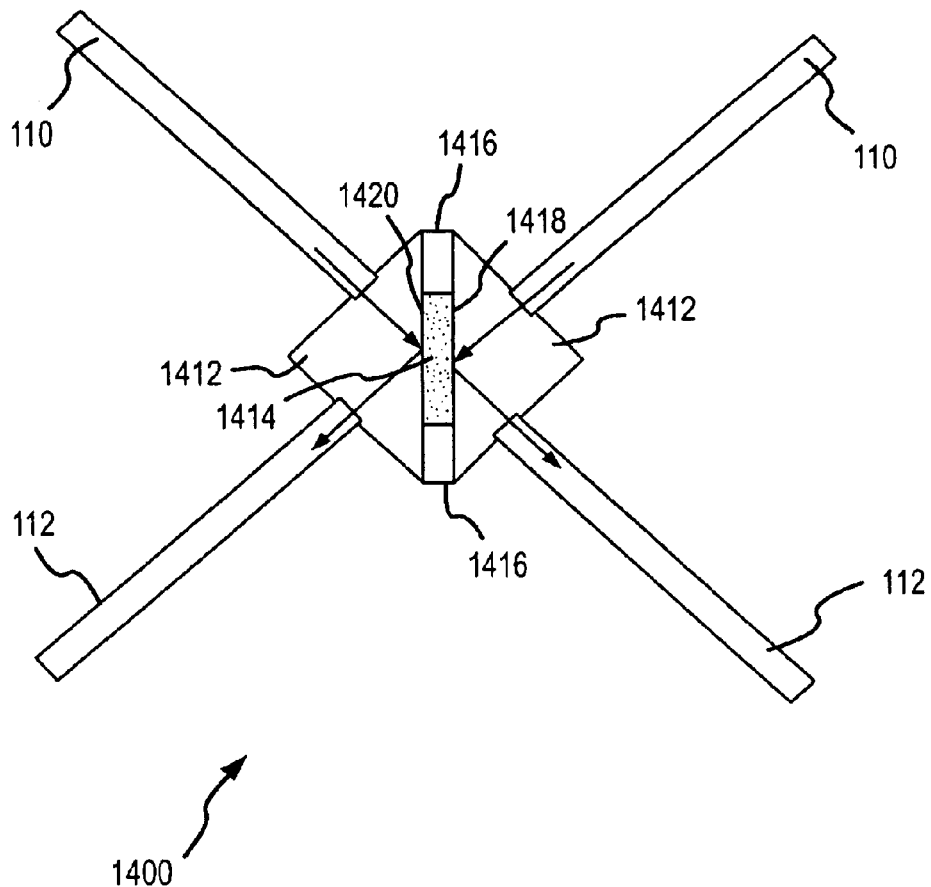
FIG. 14 is an illustration of an optical switch responsive to heat.

The switch 114 and the actuator 116 may operate in conjunction with any appropriate type of optical tunneling. For example, the switch may use total internal reflection (TIR). Referring to FIG. 14, an exemplary switching module 1400 comprises two external media 1412, such as prism-shaped media, having substantially identical refractive indices, and an intermediate medium 1414 having a variable refractive index between the external media. The refractive index of the intermediate medium 1414 is suitably lower that than that of the two external media 1412. Two interfaces 1418, 1420 formed where the external media 1412 abut the internal medium 1414 may be coated with antireflective coatings.

In operation, light from the light source 110 arrives as two beams from two input ports. The beams are incident on the first interface 1418 and the second interface 1420 separately at substantially identical angles. The angle of incidence is near the critical internal reflection angle. When the refractive index of the intermediate medium 1414 is decreased beyond a particular threshold, each of the two incident beams is totally reflected by the first and the second interfaces 1418, 1420. Alternatively, when the refractive index of the intermediate medium 1414 is increased, then the two incident beams are transmitted through the interfaces 1418, 1420 to opposite output ports.

Another exemplary form of an optical tunneling switch employs multi-interferences. Referring again to FIG. 14, an optical switch using multi-interferences may comprise the two external media 1412, such as prism-shaped media, having substantially identical refractive indices, and the intermediate medium 1414 having a variable refractive index between the external media.

Unlike the switch using TIR, the two interfaces 1418, 1420 are suitably coated with highly reflective coatings. The two input optical beams are suitably incident on the first and second interface 1418, 1420 at any angle which is smaller than the internal reflection angle. When the wavelength of the input optical signals is resonant with the cavity formed by the two interfaces, the reflective coatings, and the refractive index of the intermediate medium, the two interfaces reflect the input optical signals separately. When the wavelength of the input optical signals is not in the resonant state with the cavity, the two input optical signals will be transmitted.

Accordingly, a switch using multi-interferences may operate as a wavelength selective switch or a wavelength add/drop switch. If one input port for the incoming signals has a multiple channels on different wavelengths, and the other input port receives add-on signals with multiple wavelengths, at the reflective state, the incoming signals (for certain band of wavelength) are reflected to an output port that is treated as the passing channel. While in the transmission state, the incoming signals (for a certain wavelength) are transmitted to another output port that is treated as the drop channel. At the same time, however, the add-on signals with the same wavelength are transmitted to the first output port that is treated as the passing channel. Therefore, the add-on signals (wavelength) are added into the normal transmitting (passing) signals.

The optical tunneling may be controlled in any suitable manner according to the variable reactive material. For example, in FIG. 14, the variable refractive intermediate medium 1414 has a refractive index that varies according to temperature, such as a heat-responsive liquid crystal, organic or inorganic material, semiconductor, or polymer. Thus, the actuator 116 suitably comprises a heating or cooling system configured to selectively provide or deprive the thermal conditions for optical tunneling. In the present embodiment, the actuator 116 comprises an electric heater 1416, such as an electrical resistance on each side of the switch material 1414.

Figure 17:
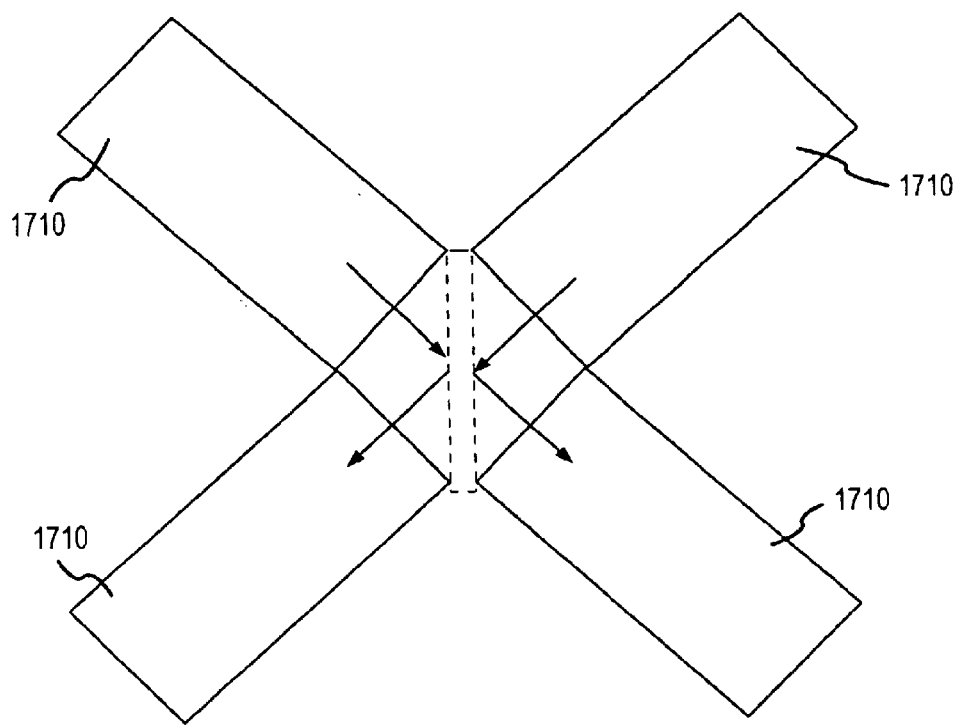
FIG. 17 is an illustration of an optical switch employing waveguides.

The heat-responsive tunneling switch module 1400 may be configured in any suitable manner. For example, the light sources 110 and light targets 112 may comprise any appropriate components and configurations. In the present embodiment, the light sources 110 and light targets 112 comprise fiber optics and collimators. Alternatively, the light sources 110 and light targets 112 may comprise optical waveguides 1710 (FIG. 17).

Figure 15:
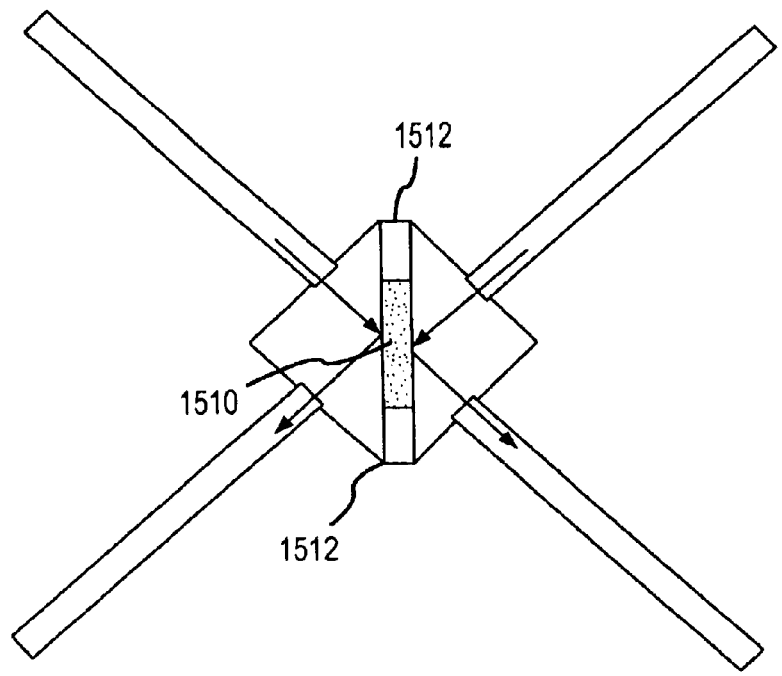
FIG. 15 is an illustration of an optical switch using a liquid crystal material.
Figure 16:
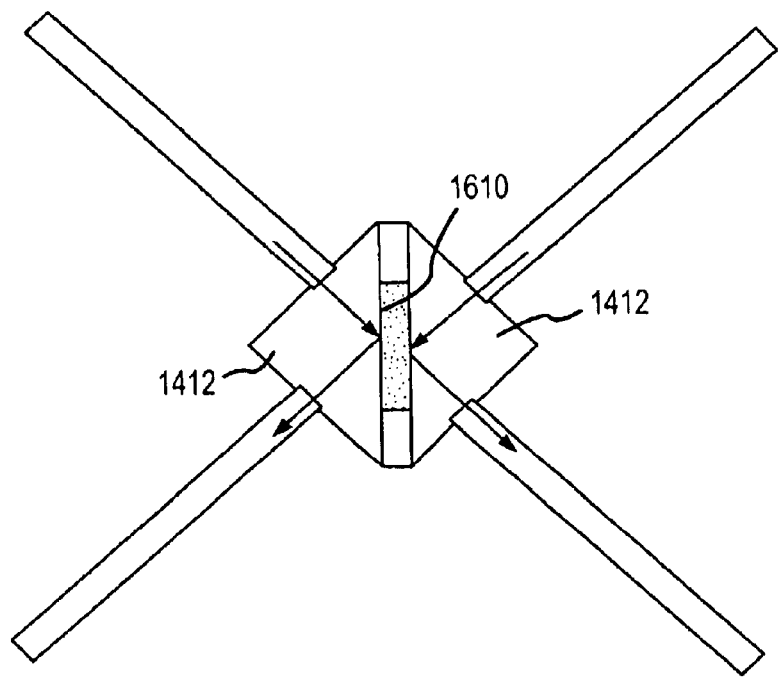
FIG. 16 is an illustration of an optical switch responsive to light.

Further, the actuator 116 and switch 114 may be configured according to the switch material used for variable refraction. For example, referring to FIG. 15, a switch material 1510 may comprise a liquid crystal material that is susceptible to variable refraction according to a particular voltage across the switch material 1510. The actuator 116 may comprise a pair of electrodes 1512 on either side of the switch material 1510 to provide the appropriate voltage. Referring to FIG. 16, an alternative switch material 1610 may be variably refractive upon exposure to light, such as a particular frequency or orientation of light. A space may be provided between the prisms 1412 to facilitate providing light to the switching material 1610.

Figure 18:
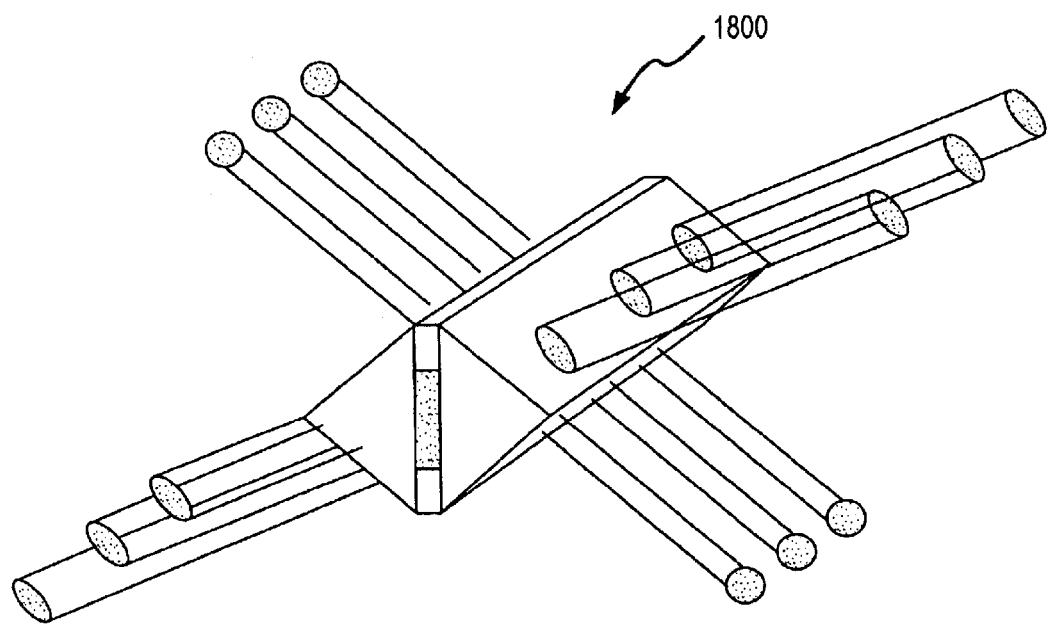
FIG. 18 is an illustration of a switch array having multiple switching elements.

The optical tunneling switch systems may also be integrated into units having multiple light sources 110 and/or multiple light targets 112. For example, referring to FIG. 18, multiple switches using optical tunneling may be adjoined to form a multiple-input and multiple-output optical switch system 1800 comprised of multiple, individually operable switch modules.

Figure 19A:
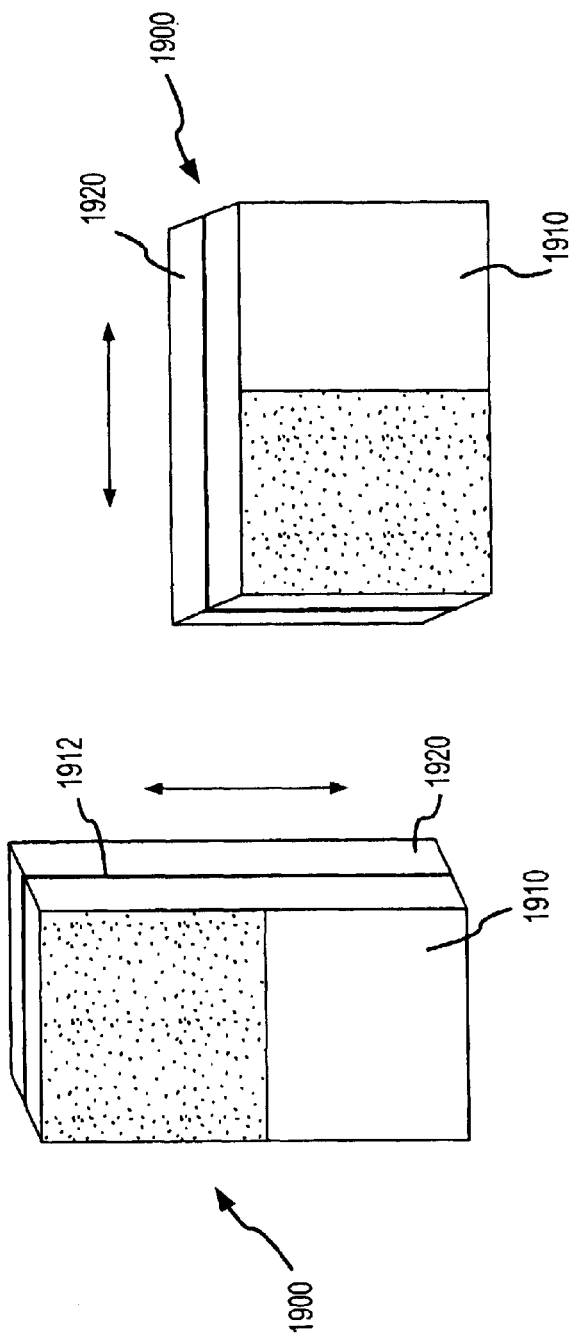
FIGS. 19A–C are illustrations of a mechanical switch.
Figure 19B:
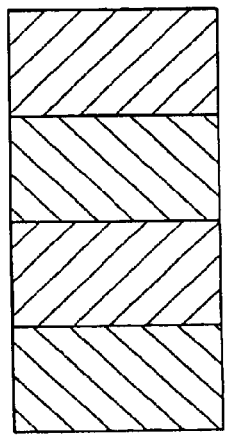
Figure 19C:
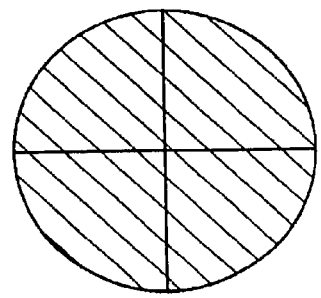

In another alternative embodiment of an optical switch system according to various aspects of the present invention, the switch 114 comprises a mechanical switch to selectively transmit light. The mechanical switch may comprise any appropriate switch for selectively transmitting, blocking, filtering, and/or reflecting light. For example, referring to FIG. 19A, a mechanical switch 1900 according to various aspects of the present invention comprises a first transparent substrate 1910 and a second transparent substrate 1920. The substrates 1910, 1920 are positioned parallel to each other. One or more materials 1912 are suitably sandwiched between the substrates 1910, 1920 to cover portions of the area of the substrates. For example, in the present embodiment, one half of the area between the substrates is covered by a reflective material such that the mechanical switch 1900 is transparent on one side and reflective on the other. Alternatively, the switch 1900 may include one or more filters (FIG. 19B), instead of or in addition to the transparent area or the reflective material, to transmit selected wavelengths and reflect others. Further, the mechanical switch 1900 may be configured in any suitable manner, for example as a rectangular, circular, or cylindrical component (FIG. 19C).

Figure 20:
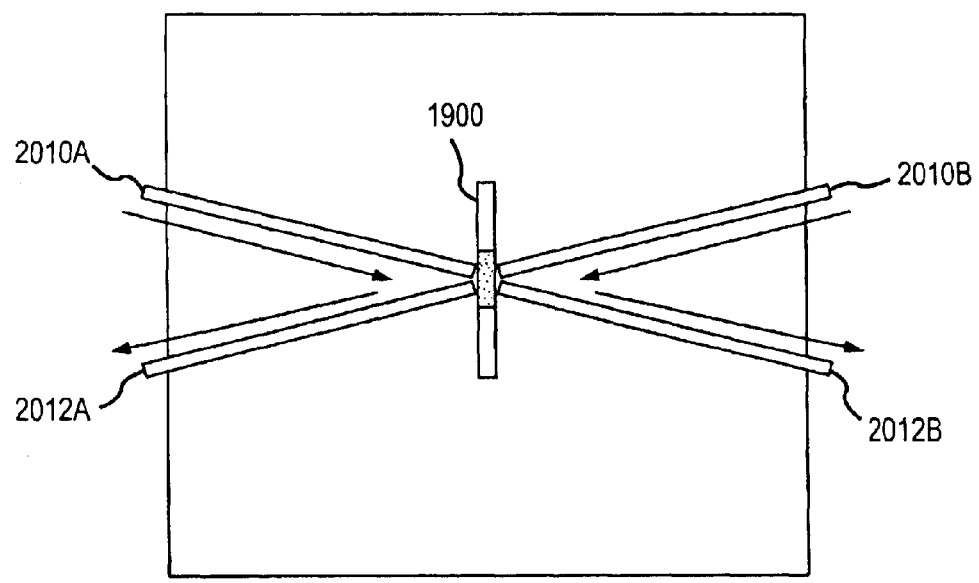
FIG. 20 is an illustration of an optical switch using a mechanical switch.

The mechanical switch 1900 may be deployed in any suitable manner to selectively transmit or reflect light from a light source 110. For example, referring to FIG. 20, the mechanical switch 1900 may be disposed between two light sources 2010 and two light targets 2012. The mechanical switch 1900 may move in any direction, such as laterally, vertically, or rotationally with respect to a substrate. The actuator 116 moves the mechanical switch 1900. The actuator 116 may comprise any suitable system for moving the mechanical switch 1900, such as a magnetic coil, a pneumatic actuator, a hydraulic actuator, or other appropriate system for moving the mechanical switch 1900.

The switch system may be configured to selectively direct light from the light source 110 to the light target 112. In the present embodiment, the mechanical switch 1900 is deployed in a 2×2 switch configuration using a crossing pattern, though any appropriate number of inputs and outputs may be used. When the mechanical switch 1900 is in a first position, the transparent portion of the mechanical switch 1900 is in the optical path, such that light from the first light source 2010A is transmitted to the second light target 2012B and light from the second light source 2010B is transmitted to the first light target 2012A. When the mechanical switch 1900 is in a second position, the reflective portion of the mechanical switch 1900 is in the optical path, such that light from the first light source 2010A is transmitted to the first light target 2012A and light from the second light source 2010B is transmitted to the second light target 2012B. The switch 1900 may operate in conjunction with any number of positions, however, for example according to the number of different portions of the switch 1900 having different transmissive or reflective characteristics.

The mechanical switch 1900 may also be deployed in conjunction with a biasing system. The biasing system suitably biases the mechanical switch 1900 to maintain a selected position. For example, the biasing system may be configured to bias the mechanical switch 1900 into a particular position in the absence of a signal, such as in the event of a power failure.

Figure 21:
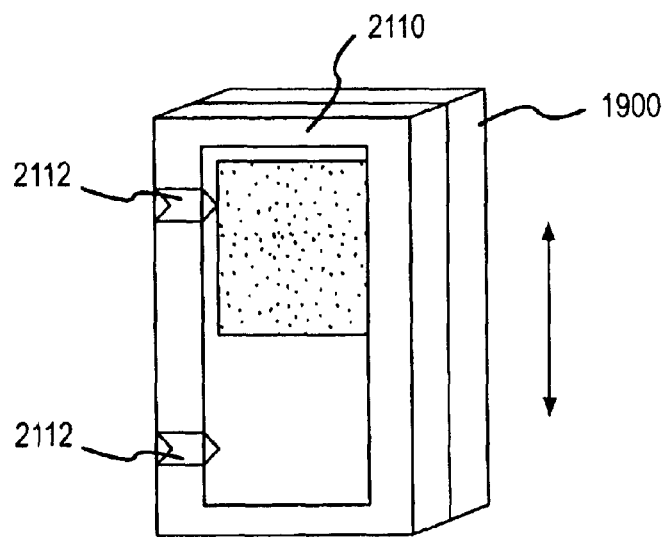
FIG. 21 is an illustration of a mechanical switch having a latching mechanism.

Referring to FIG. 21, an exemplary biasing system comprises a frame 2110 attached to the mechanical switch 1900. The frame 2110 may be configured to engage a position retainer. For example, the position retainer may comprise a spring-biased roller bearing (not shown) that is biased towards the frame 2110. The frame suitably includes a pair of notches 2112 for receiving the roller bearing. When the mechanical switch 1900 is moved to a position, the roller bearing engages one of the notches 2112, which tends to maintain the position of the frame 2110 and the mechanical switch 1900 in a position corresponding the current state of the switch.

Figure 22:
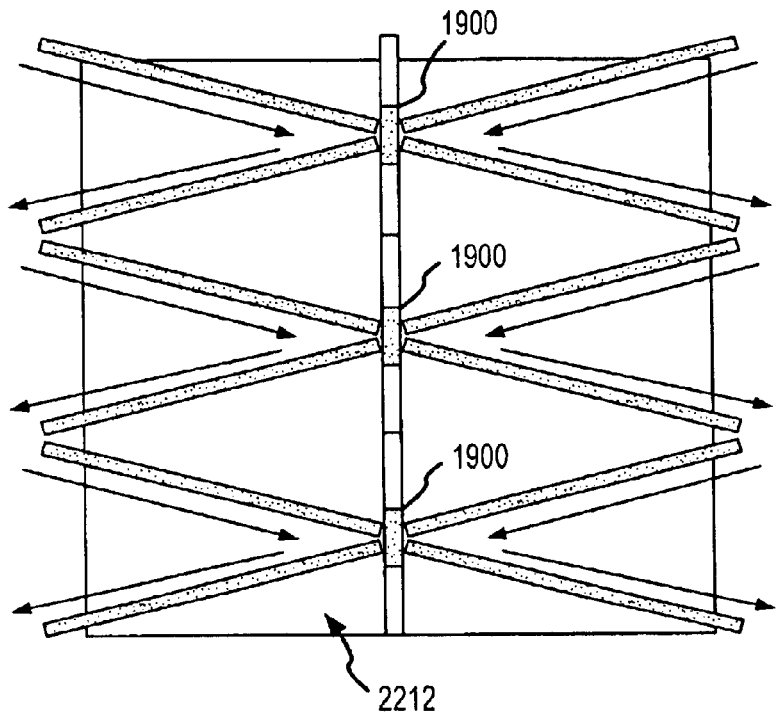
FIG. 22 is an illustration of a switching array having multiple mechanical switches.

An optical module 100 using multiple mechanical switches may also be configured as an array to accommodate multiple signals. The array may comprise any suitable configuration using multiple switches to direct optical signals from the light sources 110 to the light targets 112. For example, referring to FIG. 22, an optical switch array 2210 according to various aspects of the present invention comprises multiple mechanical switches, such as mechanical switches 1900 as described in conjunction with FIGS. 19–21. The mechanical switches 1900 are disposed between light sources 110 and light targets 112 to selectively direct light from the light sources 110 and selected light targets 112. Each mechanical switch 1900 may be operated individually to facilitate switching for each light source 110 and light target 112. In the present embodiment, the mechanical switches 1900 are configured in a linear array on a substrate 2212. The optical switch array 2210 may be configured, however, in any suitable manner.

One or more optical switch modules and/or arrays according to various aspects of the present invention may be deployed in one or more components of a larger data or other communications system. The communications system may comprise any suitable configuration for managing and directing signals, such as an optic switching module, an optic cross switching system, and/or a fast optical switch for optical packet switching applications. Furthermore, various systems may be combined to provide an optical packet cross switching (OPXC) system.

Figure 23:
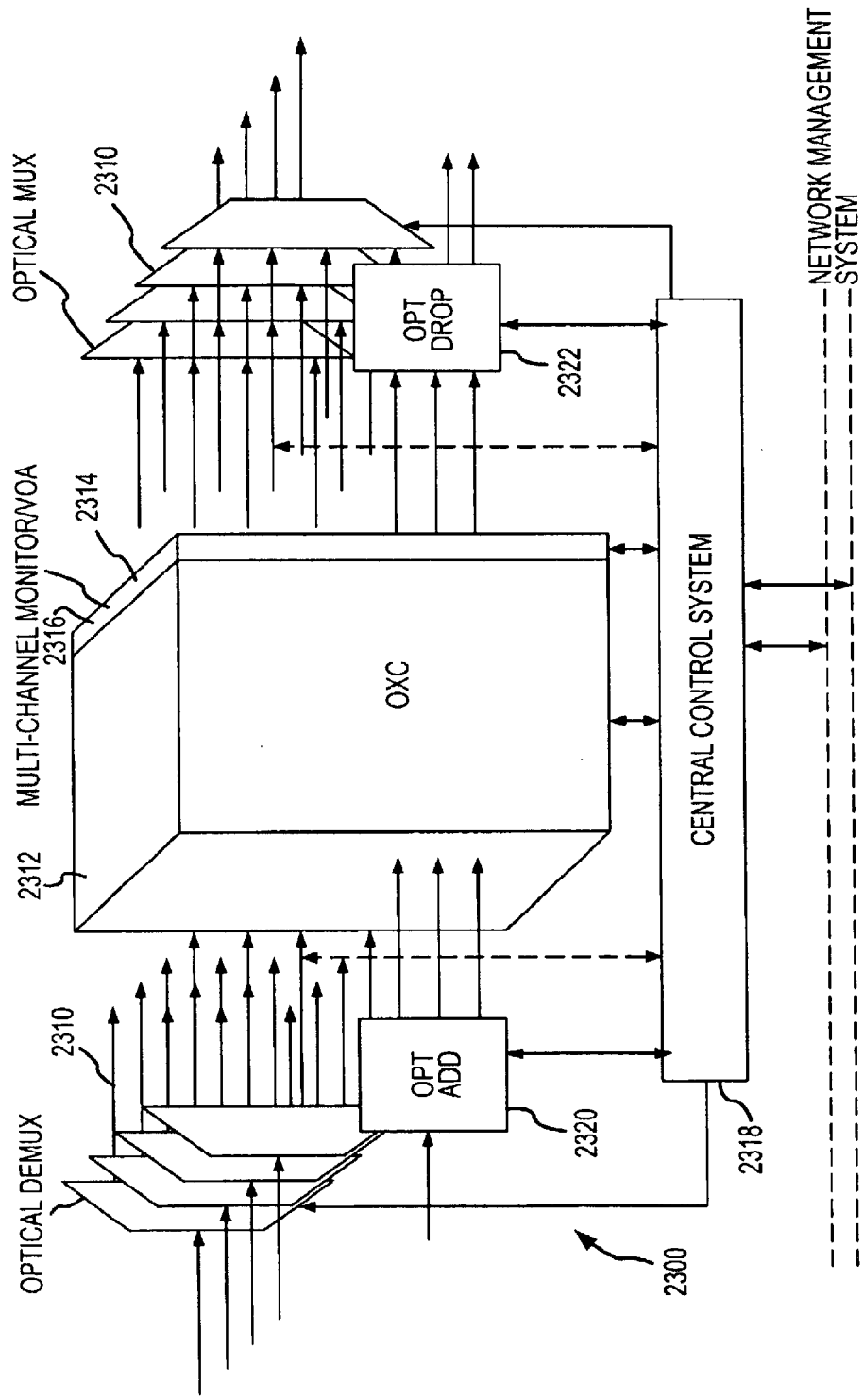
FIG. 23 is a diagram of a communications system using a switching array.

A communications system for transferring data and/or communications information may comprise a switching system for directing signals to appropriate destinations. For example, referring to FIG. 23, an optical switching system 2300 according to various aspects of the present invention suitably comprises a multiplexing system 2310, an optical cross connect (OXC) switching system 2312, a multichannel monitoring (MCM) system 2314, a variable optical attenuator (VOA) 2316, and a central control system 2318. The optical switching system 2300 may use any appropriate protocols and techniques for transferring information, such as time division multiplexing or dense wavelength division multiplexing.

The multiplexing system 2310 facilitates separation and recombination of signals and transfer of individual signals from the light source 110 to the OXC switching system 2312, and from the OXC switching system 2312 to the light target 112. In the present embodiment, the multiplexing system 2310 demultiplexes an incoming signal having multiple components on one or more inputs. For example, the incoming signal may comprise a multiplexed signal having multiple channels, such as channels using different wavelengths. The demultiplexing portion of the multiplexing system 2310 suitably separates the incoming signal into the separate channels for transmission to the OXC switching system 2312. Similarly, the multiplexing system 2310 may multiplex the outgoing channels to combine multiple outgoing signals for transfer on a single fiber or other connection.

The multiplexing system 2310 may also include an optical add/drop multiplexing (OADM) system having an optical add module 2320 and an optical drop module 2322. The OADM system facilitates addition of signals for transmission and/or diverting of signals to a different light target 112. In the present embodiment, the OADM system may accommodate electrical as well as optical signals, such that electrical signals may be converted to optical signals for transmission to light targets, or optical signals, such as drop off signals, may be converted to electrical signals for compatibility with an electrical system.

The multiplexing system 2310 may be implemented in any suitable manner. For example, the demultiplexers and/or the optical add module 2320 may include multiple optical switch modules and arrays according to various aspects of the present invention, such as a cascade of 1×2 switches like those described in conjunction with FIG. 2, configured to split a combined signal into individual components. Correspondingly, the multiplexers and/or the optical drop module 2322 may comprise a cascade of 2×1 switches, such as the switches described in conjunction with FIG. 4, to combine individual channels into one or more signals.

The OXC switching system 2312 provides for the transfer of signals from one channel or connection to another. The OXC switching system 2312 may be configured for any appropriate applications, including fiber management and distribution, resource sharing, monitoring, disaster recovery and restoration, fiber or copper testing, and/or dynamic network management. The OXC switching system 2312 may be implemented in any suitable configuration to transfer signals. In the present embodiment, the OXC switching system 2312 comprises a switching array having multiple optical switches, such as the refractive switches and/or mechanical switches described above. For example, the OXC switching system 2312 may comprise a 3-D switching array, such as the 3-D switching array 700.

Figure 24:
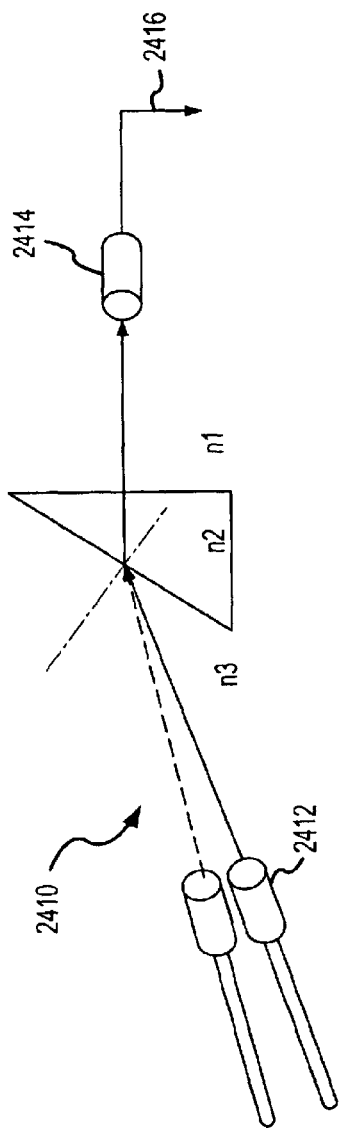
FIG. 24 is a diagram of a 2×1 switch coupled to a signal detector.

The MCM system 2314 and VOA 2316 are suitably connected to the OXC switching system 2312 to monitor and optimize signals transferred from the OXC switching system 2312 to the multiplexing system 2310. The MCM system 2314 may be implemented in any suitable configuration, such as one or more N×1 optical switch modules having signal detectors, for example an optical switch system 400 as described in FIG. 4 and having light target 412 including a signal detector. The N×1 optical switch may comprise, however, any suitable optical switching module. Referring to FIG. 24, in the present embodiment, the N×1 optical switch 2410 includes an input port 2412 and an output port 2414. The input port 2412 suitably has one or more input channels, each of which is suitably collimated. The output port 2414 has at least one output channel having an aperture. Light from the aperture is provided to a signal detector 2416 for analysis of the signal. For example, the light from the aperture may be provided as a feedback signal to the central control system 2318 for analysis.

The MCM system 2314 may also comprise an optical testing system and a signal processing system. The optical testing system is also configured to test various signal characteristics, such as the optical signal intensity, wavelength, and polarization of signals handled by the OXC switching system 2312, using the signal processing system. The optical testing system may then provide information to the central control system, such as via the feedback system, to adjust the signal characteristics into desired ranges or to desired targets.

The VOA 2316 may provide any appropriate function for adjusting signals in the optical switching system 2300, such as flattening the output of the OXC switching system 2312, balancing signal levels, and protecting receivers against overloads. In the present embodiment, the VOA 2316 is integrated into the OXC switching system 2312, and may operate in conjunction with the feedback signals from the MCM system 2314. In the present embodiment, the VOA 2316 comprises a multi-channel optical variable attenuation (MCOVA) system having multiple channels to address multiple signals simultaneously. The VOA 2316 suitably also responds to signals from the central control system 2318.

In the present embodiment, the VOA 2316 may be integrated into the OXC switching system 2312. For example, if the MCM system 2314 indicates that an optical signal is too intense, the MCM system 2314 and/or the central control system 2318 may signal the VOA 2316 to reduce the intensity of the signal. In the present embodiment, the VOA 2316 may reduce the intensity of the signal by adjusting the refractive index of the corresponding switch module. By adjusting the refractive index, the direction of the optical beam may be slightly misaligned with the receiving port, which tends to reduce the intensity of the resulting optical signal.

The central control system 2318 provides the control function for the various components of the optical switching system 2300, such as the OADM system 2310, the OXC switching system 2312, the MCM system 2314, and the VOA 2316. The central control system 2318 may comprise any suitable control system, such as a conventional computer system configured for managing switch traffic. The central control system 2318 may also be connected to a network management system for integration into another communications system. In the present embodiment, the central control system 2318 receives signals from the MCM system 2314 and adjusts various output signals accordingly. For example, the central control system may provide signals to the VOA 2316 to alter signal intensity or another characteristic.

The communications system may also be configured to accommodate optical packet switching, such as optical packet add/drop switching. Packet signals suitably comprise signals having a header and a payload. The header describes characteristics of the packet signal, and the payload comprises the data for the signal.

Figure 25A:
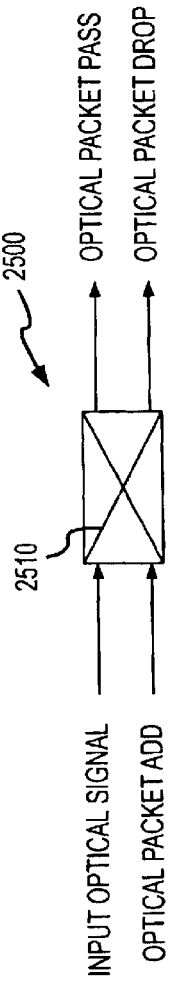
FIGS. 25A–B are diagrams of optical packet switches.

To accommodate packet signals, the communications system may utilize fast switches for adding, passing, and dropping packets. The switches may be configured in any suitable manner, including a multiple switches in parallel, in a cascade, or in any other configuration. For example, referring to FIG. 25A, an optical packet switch module 2500 suitably comprises a switch 2510 having two inputs for input optical signals and additional optical packet signals. The switch 2510 also has two outputs, one for passsing optical packet signals and the other for dropping optical packet signals. The switch 2510 may be configured, however, to have any suitable number of inputs and outputs. The switch 2510 suitably comprises a fast switch for switching signals, for example according to information in the header portion of the packet. For example, in the present embodiment, the switch 2510 comprises a switch having a single switching signal for controlling the switching, such as a 2×2 switch using a crossing pattern like those described in conjunction with FIGS. 14–18, 20, and 22.

Figure 25B:
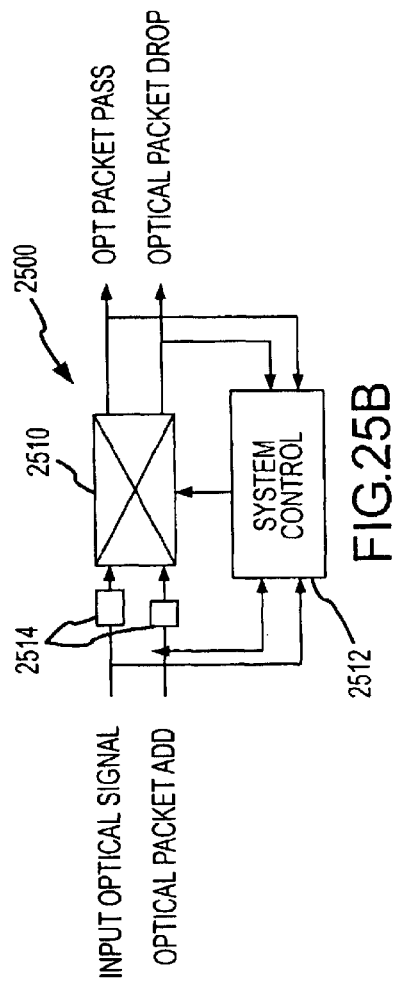

The optical packet switch module 2500 may also include a control system for controlling the switching function, for example in conjunction with information in the packet signal. For example, referring to FIG. 25B, a system control unit 2512 receives signals from the input optical signal and the additional optical input signal, for example through beam splitters, and may receive signals from the pass signal output and the drop signal output as well. Based on the information in the various signals, the system control unit 2512 may operate the switch 2510 to direct the signals. In addition, the optical switching system may include optical delay lines 2514 in the optical path, and/or the system control unit 2512 may provide a data buffer and/or a delaying function to facilitate proper switching. For example, the system control unit 2512 may include optical-to-electrical signal conversion and electrical-to-optical signal conversion to facilitate delays for effective packet switching and/or to provide compatibility with electrical systems.

Figure 26:
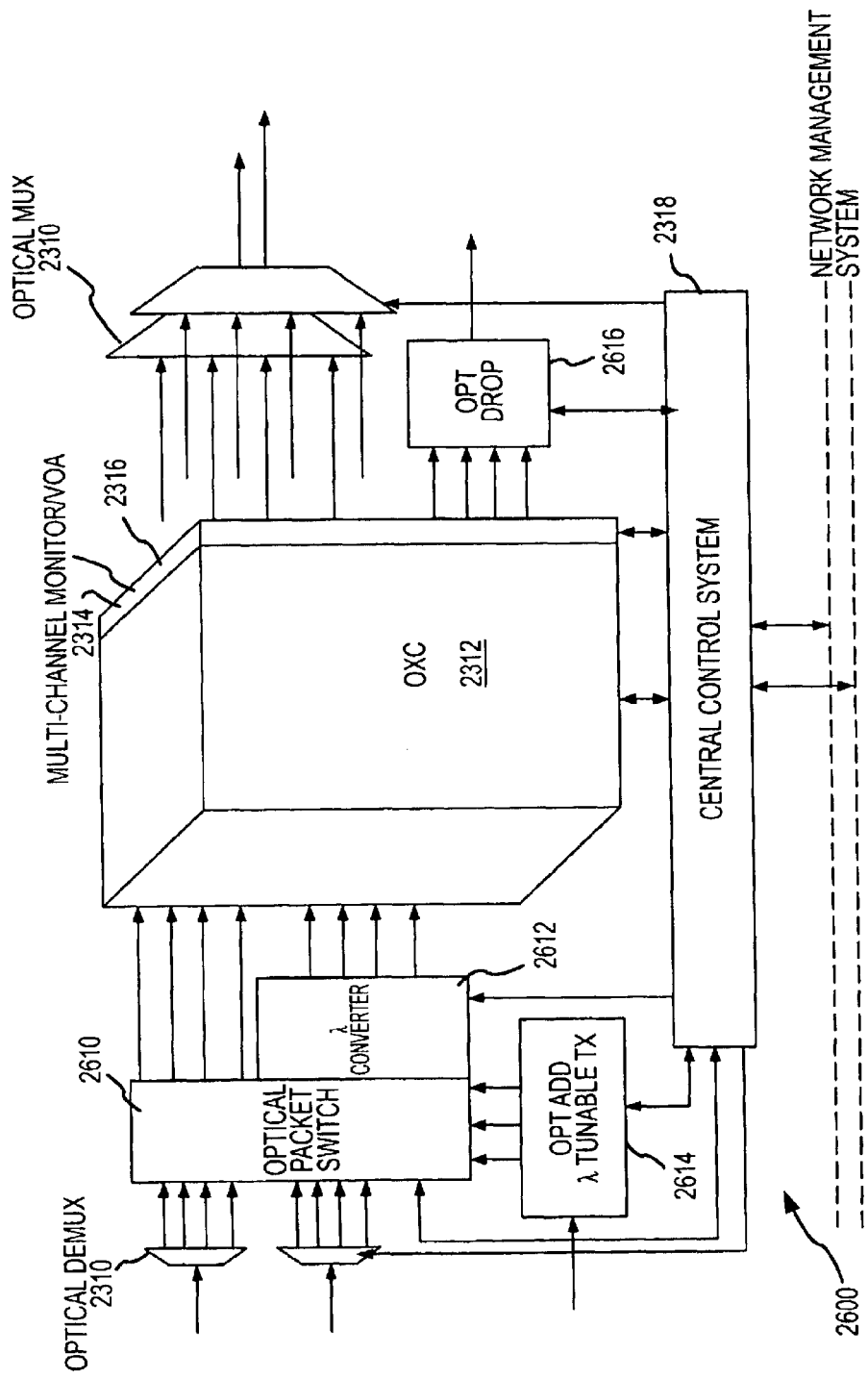
FIG. 26 is a diagram of a communications system using a switching array and configured for optical packets.

A packet switching system may be configured to handle packet signals, for example using the various optical switches and the packet switching systems. The communications system may be configured in any appropriate configuration for handling packet traffic. For example, referring to FIG. 26, an optical packet communications system 2600 according to various aspects of the present invention comprises an optical packet cross connection (OPXC) communications system including an optical packet switch 2610. The OPXC communications system 2600 also suitably includes other components for facilitating operations such as the multiplexing system 2310, the optical cross connect (OXC) switching system 2312, the multichannel monitoring (MCM) system 2314, the variable optical attenuator (VAO) 2316, and the central control system 2318. The OPXC communications system 2600 may use any appropriate protocols and techniques for transferring information, such as time division multiplexing or dense wavelength division multiplexing.

The optical packet switch 2610 receives input signals, such as from the demultiplexing system 2310, and directs the incoming signals according to, at least in part, information in the packet. The optical packet switch 2610 may be configured in any suitable manner, for example comprising an array of optical packet switch modules 2500. The optical packet switch 2610 may also operate in conjunction with a conversion system for altering signals for effective handling. For example, the present optical packet communications system 2600 includes a wavelength converter 2612 to facilitate changing the wavelength of a signal. The wavelength converter 2612 may be used by the optical packet communications system 2600 to change the wavelength of a particular signal so that it may be used in a different channel. Thus, if a particular channel (corresponding to a particular wavelength) is overburdened, the optical packet communications system 2600 may change the wavelength of the signal for transmission via a different channel.

The multiplexing system 2310 also suitably includes a wavelength tunable optical add module 2614. The wavelength tunable optical add module 2614 facilitates addition of signals for transmission. The wavelength tunable optical add module 2614 may accommodate electrical signals, which may be converted into optical signals having a particular wavelength for transmission on a selected channel. The wavelength tunable optical add module 2614 may also convert the added signal into a packet.

Similarly, the multiplexing system 2310 also suitably includes a wavelength tunable optical drop module 2616. The wavelength combining optical drop module 2616 facilitates dropping of signals for transmission to another system. The wavelength combining optical drop module 2616 may accommodate electrical signals, which may be converted from optical signals having a particular wavelength for transmission as electrical signals. The wavelength combining optical drop module 2616 may also convert the added signal into or from a packet.

The optical packet communications system 2600 may also include any other appropriate components. For example, various subsystems, such as the multiplexing system 2310, the optical cross connect (OXC) switching system 2312, the multichannel monitoring (MCM) system 2314, the variable optical attenuator (VAO) 2316, the wavelength converter 2612, the wavelength tunable optical add module 2614, the wavelength combining optical drop module 2616, and the optical packet switch 2610, may have dedicated control units. For example, the control units may comprise distributed control units connected with the central control system 2318 to offload tasks from the central control system 2318. In addition, the central control system 2318 may be configured to communicate with the network management system through the optical packet switch 2610.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

What is claimed is:

1. An optical switch for selectively transmitting light from a light source to a light target, including:
   at least one input configured to receive the light from the light source;
   at least one output configured to provide the light to the light target; and
   a switch configured to selectively transmit the light from the input to the output via a selected optical path, wherein the switch includes at least one of:
      a variable refractive material having at least a first state and a second state, wherein the light is transmitted via a first path when the variable refractive material is in the first state and the light is transmitted via a second path when the variable refractive material is in the second state; and
      a switch element having a reflective state and a transmissive state, wherein the light is reflected via a first path when the switch element is in the reflective state and the light is transmitted via a second path when the switch element is in the transmissive state.

2. An optical switch according to claim 1, wherein only a light within a selected wavelength range is substantially reflected via the first path when the switch element is in the reflective state and the light within the selected wavelength range is substantially transmitted via the second path when the switch element is in the transmissive state.

3. An optical switch according to claim 1, wherein the switch element has a filter state, wherein a light of a first wavelength is reflected via the first path and a light of a second wavelength is transmitted via the second path when the switch element is in the filter state.

4. An optical switch according to claim 1, wherein the variable refractive material changes from the first state to the second state in response to a change in at least one of an electric field, a magnetic field, a control light, and a temperature applied to the variable refractive material.

5. An optical switch according to claim 1, wherein the switch element changes between the transmissive state and the reflective state in response to a change in at least one of an electric field, a magnetic field, a control light, and a temperature applied to the switch element.

6. An optical switch according to claim 1, wherein the selected optical path is a three-dimensional path.

7. An optical switch according to claim 1, wherein the switch includes:

the first variable refractive material having the first state and the second state, wherein the light is transmitted via the first path when the first variable refractive material is in the first state and the light is transmitted via the second path when the first variable refractive material is in the second state; and a second variable refractive material configured to receive the light from the first variable refractive material only when the first variable refractive material is in the first state, and wherein the second variable material has a first state and a second state, wherein the light is transmitted via a third path when the second variable refractive material is in the first state and the light is transmitted via a fourth path when the second variable refractive material is in the second state.

8. An optical switch according to claim 1, wherein the switch is configured to receive the light from two light sources and direct the light to one light target, wherein the light is directed from the first light source to the light target when the switch is in the first state and the light from the second light source is directed to the light target when the switch is in the second state.

9. An optical switch according to claim 8, wherein at least part of the light from the switch is provided as a feedback signal to a feedback system.

10. An optical switch according to claim 1, wherein the switch element includes a reflective portion and a transmissive portion, and wherein the reflective portion is moved into the selected optical path when the switch element is in the reflective state and the transmissive portion is moved into the selected optical path when the switch element is in the transmissive state.

11. An optical switch according to claim 1, wherein the switch element includes a latch mechanism to maintain a selected state of the switch element.

12. An optical switch according to claim 11, wherein the latch mechanism includes:
at least one notch defined in the switch element; and
a retainer configured to lodge within the notch when the switch element is in the selected state.

13. An optical switch according to claim 1, wherein the switch element may be switched between the reflective state and the transmissive state by one signal.

14. An optical switch according to claim 1, wherein the reflective state and the transmissive state are wavelength dependent.

15. An optical switch according to claim 1, wherein the switch element includes a material that changes between the reflective state and the transmissive state in response to an event without moving.

16. An optical switch according to claim 1, wherein the switch comprises at least one of optical media, optical cavities, cells, windows, waveguides, fibers, lenses, filters, coatings, optical interfaces, optical resonance cavities, and mirrors.

17. An optical switch according to claim 1, wherein the switch changes state in response to a change in a control light.

18. An optical switch according to claim 1, further including at least one lens configured to change the optical path of the light.

19. An optical switch according to claim 18, wherein the lens includes a concave lens.

20. An optical switch according to claim 18, wherein the lens is configured to enlarge an angle change of the optical path.

21. An optical switch according to claim 1, wherein the variable refractive material comprises at least one of a solid medium, a plastic medium, a liquid medium, a liquid crystal, or a gaseous medium.

22. An optical switch according to claim 1, further including a second switch in the selected optical path.

23. An optical switch according to claim 1, wherein the optical path is adjustable with respect to the light target to adjust an optical signal level.

24. An optical switch according to claim 1, wherein the switch is configured to transmit packet signals according to information in the packet signals.

25. An optical switch according to claim 24, further including a control system configured to receive the information in the packet signals and control the state of the switch according to the information.

26. An optical switch according to claim 25, further including an optical delay system between the light source and the switch.

27. A communications system, including:
a demultiplexer configured to receive multiple channels of optical signals via one connection and separate each channel into an individual channel signal;
a switching system configured to receive each individual channel signal from the demultiplexer and direct the individual channel signal along a selected optical path, wherein the switching system includes more than one switch, and wherein at least one of the switches includes at least one of:
a variable refractive material having at least a first state and a second state, wherein the individual channel signal is transmitted via a first path when the variable refractive material is in the first state and the individual channel signal is transmitted via a second path when the variable refractive material is in the second state; and
a switch element having a reflective state and a transmissive state, wherein the individual channel signal is substantially reflected via a first path when the switch element is in the reflective state and the individual channel signal is substantially transmitted via a second path when the switch element is in the transmissive state; and a control system configured to control the switching system.

28. A communications system according to claim 27, wherein only an individual channel signal within a selected wavelength range is substantially reflected via the first path when the switch element is in the reflective state and the individual channel signal within the selected wavelength range is substantially transmitted via the second path when the switch element is in the transmissive state.

29. A communications system according to claim 27, wherein the switch element has a filter state, wherein a first channel signal of a first wavelength is substantially reflected via the first path and a second channel signal of a second wavelength is substantially transmitted via the second path when the switch element is in the filter state.

30. A communications system according to claim 27, wherein the variable refractive material changes from the first state to the second state in response to a change in at least one of an electric field, a magnetic field, a control light, and a temperature applied to the variable refractive material.

31. A communications system according to claim 27, wherein the switch element changes between the transmissive state and the reflective state in response to a change in at least one of an electric field, a magnetic field, a control light, and a temperature applied to the switch element.

32. A communications system according to claim 27, wherein the selected optical path is a three-dimensional path.

33. A communications system according to claim 27, wherein the switch includes:
   the first variable refractive material having the first state and the second state, wherein the individual channel signal is transmitted via the first path when the first variable refractive material is in the first state and the individual channel signal is transmitted via the second path when the first variable refractive material is in the second state; and
   a second variable refractive material configured to receive the individual channel signal from the first variable refractive material only when the first variable refractive material is in the first state, and wherein the second variable refractive material has a first state and a second state, wherein the individual channel signal is transmitted via a third path when the second variable refractive material is in the first state and the individual channel signal is transmitted via a fourth path when the second variable refractive material is in the second state.

34. A communications system according to claim 27, wherein the at least one of the switches is configured to receive two individual channel signals and direct the individual channel signals along a single selected path, wherein a first individual channel signal is directed along the single selected path when the switch is in the first state and a second individual channel signal is directed along the single selected path when the switch is in the second state.

35. A communications system according to claim 34, wherein at least part of the individual channels signal directed along the single selected path is provided as a feedback signal to a feedback system.

36. A communications system according to claim 27, wherein the switch element includes a reflective portion and a transmissive portion, and wherein the reflective portion is moved into the path of the individual channel signal when the switch element is in the reflective state and the transmissive portion is moved into the path of the individual channel signal when the switch element is in the transmissive state.

37. A communications system according to claim 27, wherein the switch element includes a latch mechanism to maintain a selected state of the switch element.

38. A communications system according to claim 37, wherein the latch mechanism includes:
   at least one notch defined in the switch element; and
   a retainer configured to lodge within the notch when the switch element is in the selected state.

39. A communications system according to claim 27, wherein the switch element may be switched between the reflective state and the transmissive state by one signal.

40. A communications system according to claim 27, wherein the reflective state and the transmissive state are wavelength dependent.

41. A communications system according to claim 27, wherein the selected optical path is adjustable with respect to a light target to adjust a level of the individual channel signal.

42. A communications system according to claim 27, wherein at least one of the switches comprises at least one of optical media, optical cavities, cells, windows, waveguides, fibers, lenses, filters, coatings, optical interfaces, optical resonance cavities, and mirrors.

43. A communications system according to claim 27, wherein the switch element includes a material that changes between the reflective state and the transmissive state in response to an event without moving.

44. A communications system according to claim 27, wherein the at least one of the switches changes state in response to a change in a control light.

45. A communications system according to claim 27, wherein the variable refractive material comprises at least one of a solid medium, a plastic medium, a liquid medium, a liquid crystal, or a gaseous medium.

46. A communications system according to claim 27, further including at least one lens configured to change the selected optical path.

47. A communications system according to claim 46, wherein the lens includes a concave lens.

48. A communications system according to claim 46, wherein the lens is configured to enlarge an angle change of the selected optical path.

49. A communications system according to claim 27, further including a second switch in the selected optical path.

50. A communications system according to claim 27, wherein the switch is configured to transmit packet signals according to information in the packet signals.

51. A communications system according to claim 50, further including a switch control system configured to receive the information in the packet signals and control the state of the switch according to the information in the packet signals.

52. A communications system according to claim 51, further including an optical delay system between the demultiplexer and the switching system.

53. A communications system according to claim 27, further including a monitoring system configured to monitor the individual channel signal from the switching system and provide information relating to a quality of the monitored signal.

54. A communications system according to claim 27, further including a signal adjustment system configured to adjust a quality of the individual channel signals provided by the switching system.

55. A communications system according to claim 54, wherein the signal adjustment system is configured to adjust a refractive index of the variable refractive material.

56. A method of transmitting an optical signal from a light source to a light target, including:
   identifying a selected optical path for the optical signal;
   directing the optical signal via the selected optical path, wherein directing the optical signal includes at least one of:
      changing a refractive state of a switch from a first state to a second state, wherein a first path is selected when the switch is in the first state and a second path is selected when the switch is in the second state; and
      changing a state of a switch element having a reflective state and a transmissive state, wherein a first path is selected when the switch element is in the reflective state and a second path is selected when the switch element is in the transmissive state.

57. A method of transmitting an optical signal according to claim 56, wherein the optical path of only an optical signal within a selected wavelength range is selected according to the state of the switch element.

58. A method of transmitting an optical signal according to claim 56, wherein changing the refractive state of the switch includes changing at least one of an electric field, a magnetic field, a control light, and a temperature applied to the variable refractive material.

59. A method of transmitting an optical signal according to claim 56, wherein changing the state of the switch element having the reflective state and the transmissive state includes changing at least one of an electric field, a magnetic field, a control light, and a temperature applied to the switch element.

60. A method of transmitting an optical signal according to claim 56, wherein the selected optical path is a three-dimensional path.

61. A method of transmitting an optical signal according to claim 56, further including changing a second switch from a first state to a second state, wherein the second switch is configured to receive the optical signal from the first switch only when the second switch is in the selected optical path, and wherein the second switch has a first state and a second state, wherein the optical signal is transmitted via a third path when the second switch is in the first state and the optical signal is transmitted via a fourth path when the second switch is in the second state.

62. A method of transmitting an optical signal according to claim 56, wherein the switch element includes a reflective portion and a transmissive portion, and wherein changing the state of the switch element includes moving the reflective portion into the selected optical path of the optical signal when the switch element is in the reflective state and moving the transmissive portion into the selected optical path of the optical signal when the switch element is in the transmissive state.

63. A method of transmitting an optical signal according to claim 56, wherein the switch element includes a material that changes between the reflective state and the transmissive state in response to an event without moving.

64. A method of transmitting an optical signal according to claim 56, wherein directing the optical signal includes changing a control light along a control path that is parallel to at least a part of the selected optical path.

65. A method of transmitting an optical signal according to claim 56, wherein the optical signals include packet signals.

66. A method of transmitting an optical signal according to claim 65, further including:
reading information in the packet signals; and
directing the optical signal according to the information in the packet signals.

67. An optical packet cross-switching system, comprising:
at least one optical wavelength de-multiplexing (DeMUX) module;
at least one optical wavelength multiplexing (MUX) module;
at least one optical packet switching system;
at least one optical across switch;
at least one Multi-channel monitoring (MCM) system;
at least one multi-channel optical variable attenuation (MCOVA) system which is a built-in function of the optical switching modules;
at least one optical ADD module which contains at least one wavelength tunable transmitters and/or electrical signal to optical signal converter;
at least one optical Drop module with wavelength combiner and/or optical signal to electrical signal converter;
at least one central control system;
at least one communication port links to the network management system; and
the software to run the whole system.

68. An optical packet cross-switching system according to claim 67, wherein the system is connected as the following sequence:
the optical wavelength de-multiplexing (DeMUX) modules are connected to optical packet switches;
optical ADD modules are connected to the optical packet switches;
the optical packet switches are connected to optical cross switches;
the optical cross switches are connected to the optical Drop modules and optical wavelength multiplexing (MUX) modules; and
the central control unit is connected with the network management system and each subsystem list above.

69. An optical packet cross-switching system according to claim 67, wherein each element includes a distributed control unit, and wherein each distributed control unit is connected to the central control unit.

70. An optical packet cross-switching system according to claim 67, wherein the central control unit of the optical packet cross switching system can communicate with a network management system through the packet switching unit as an option.

* * * * *